US012795174B2

(12) United States Patent
Meardi

(10) Patent No.: US 12,795,174 B2
(45) Date of Patent: Nov. 10, 2026

(54) VIDEO DECODING USING POST-PROCESSING CONTROL

(71) Applicant: V-NOVA INTERNATIONAL LIMITED, London (GB)

(72) Inventor: Guido Meardi, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 321 days.

(21) Appl. No.: 18/254,821

(22) PCT Filed: Nov. 26, 2021

(86) PCT No.: PCT/GB2021/053071
§ 371 (c)(1),
(2) Date: May 26, 2023

(87) PCT Pub. No.: WO2022/112775
PCT Pub. Date: Jun. 2, 2022

(65) Prior Publication Data

US 2024/0305834 A1 Sep. 12, 2024

(30) Foreign Application Priority Data

Nov. 27, 2020 (GB) ...................................... 2018755

(51) Int. Cl.
*H04N 19/85* (2014.01)
*H04N 19/30* (2014.01)

(52) U.S. Cl.
CPC ............. *H04N 19/85* (2014.11); *H04N 19/30* (2014.11)

(58) Field of Classification Search
CPC ................................ H04N 19/85; H04N 19/30
See application file for complete search history.

(56) References Cited

U.S. PATENT DOCUMENTS

2010/0046612 A1 2/2010 Sun et al.
2011/0116654 A1* 5/2011 Chan ................ G10K 11/17873 381/94.1

(Continued)

FOREIGN PATENT DOCUMENTS

CN 104854621 A 8/2015
EP 2958101 12/2015
WO 2021064413 4/2021

OTHER PUBLICATIONS

Giulio Urlini, The OpenMAX Integration Layer Standard, (45 pages) Advanced System Technology.

(Continued)

*Primary Examiner* — Jae N Noh
(74) *Attorney, Agent, or Firm* — Workman Nydegger

(57) ABSTRACT

There is provided a method for video encoding. The method includes receiving an indication of a desired video output resolution from a rendering platform. The method also includes decoding one or more received video streams into a reconstructed video out stream, wherein post-processing is applied prior to output of the reconstructed video stream. The method further includes applying a sample conversion from the reconstructed video output stream resolution to the desired video output resolution prior to the post-processing when the desired video output resolution differs from the reconstructed video output stream resolution.

20 Claims, 12 Drawing Sheets

(56) References Cited

U.S. PATENT DOCUMENTS

| | | | | |
|---|---|---|---|---|
| 2014/0119456 | A1 | 5/2014 | Bivolarsky | |
| 2016/0269739 | A1* | 9/2016 | Tourapis | H04N 19/132 |

OTHER PUBLICATIONS

Test model of Low Complexity Enhancement Video Coding (11 pages), Aug. 9, 2019.
Text of ISO/IEC CD 23094-2, Low Complexity Enhancement Video Coding (96 pages), Nov. 6, 2019.
Office Action received for EP Patent Application No. 21834837.3, mailed on Jun. 25, 2025, 5 pages.
Office Action received for Chinese Patent Application No. 202180079641.9, mailed on Jul. 16, 2025, 14 pages (7 pages of English Translation and 7 pages of Original Document).
International Preliminary Report on Patentability received for PCT Patent Application No. PCT/GB2021/053071, mailed on Jun. 8, 2023, 10 pages.
International Search Report and Written Opinion received for PCT Patent Application No. GB2021/053071, Mailed Mar. 21, 2022, 13 pages.

* cited by examiner

VIDEO DECODING USING POST-PROCESSING CONTROL

CROSS-REFERENCE TO RELATED APPLICATIONS

This application is a 371 US Nationalization of International Application No. PCT/GB2021/053071, filed Nov. 26, 2021, which claims priority to United Kingdom Patent Application No. 2018755.5, filed Nov. 27, 2020, the disclosures of which are hereby incorporated by reference herein in their entirety.

TECHNICAL FIELD

The present invention relates to methods for processing signals, such as by way of non-limiting examples video, image, hyperspectral image, audio, point clouds, 3DoF/6DoF and volumetric signals. Processing data may include, but is not limited to, obtaining, deriving, encoding, outputting, receiving and reconstructing a signal in the context of a hierarchical (tier-based) coding format, where the signal is decoded in tiers at subsequently higher level of quality, leveraging and combining subsequent tiers ("echelons") of reconstruction data. Different tiers of the signal may be coded with different coding formats (e.g., by way of non-limiting examples, traditional single-layer DCT-based codecs, ISO/IEC MPEG-5 Part 2 Low Complexity Enhancement Video Coding SMPTE VC-6 2117, etc.), by means of different elementary streams that may or may not be multiplexed in a single bitstream.

BACKGROUND

In tier-based coding formats such as ISO/IEC MPEG-5 Part 2 LCEVC (hereafter "LCEVC"), or SMPTE VC-6 2117 (hereafter "VC-6"), a signal is decomposed in multiple "echelons" (also known as "hierarchical tiers") of data, each corresponding to a "Level of Quality" ("LoQ") of the signal, from the highest echelon at the sampling rate of the original signal to a lowest echelon, which typically has a lower sampling rate than the original signal. In the non-limiting example when the signal is a frame of a video stream, the lowest echelon may be a thumbnail of the original frame, or even just a single picture element. Other echelons contain information on corrections to apply to a reconstructed rendition in order to produce the final output. Echelons may be based on residual information, e.g. a difference between a version of the original signal at a particular level of quality and a reconstructed version of the signal at the same level of quality. A lowest echelon may not comprise residual information but may comprise a lowest sampling of the original signal. The decoded signal at a given Level of Quality is reconstructed by first decoding the lowest echelon (thus reconstructing the signal at the first—lowest—Level of Quality), then predicting a rendition of the signal at the second—next higher—Level of Quality, then decoding the corresponding second echelon of reconstruction data (also known as "residual data" at the second Level of Quality), then combining the prediction with the reconstruction data so as to reconstruct the rendition of the signal at the second—higher—Level of Quality, and so on, up to reconstructing the given Level of Quality. Reconstructing the signal may comprise decoding residual data and using this to correct a version at a particular Level of Quality that is derived from a version of the signal from a lower Level of Quality. Different echelons of data may be coded using different coding formats, and different Levels of Quality may have different sampling rates (e.g., resolutions, for the case of image or video signals). Subsequent echelons may refer to a same signal resolution (i.e., sampling rate) of the signal, or to a progressively higher signal resolution.

After the reconstruction of a signal to a particular Level of Quality and before rendering said signal on a device's display, it is generally considered advantageous to apply post-processing (e.g., dithering) to the reconstructed signal in order to achieve best visual results. In certain applications, it may be preferred for the signal for display to have a specific resolution. After determining the specific resolution, the reconstructed signal may undergo sample conversion (i.e., upsampling or downsampling) to achieve said desired resolution. However, combining the post-processing and sample conversion may lead to undesired effects on the rendered signal. Therefore, a technique is desired which improves the rendered signal in these situations.

SUMMARY

Aspects and variations of the present invention are set out in the appended claims.

Certain unclaimed aspects are further set out in the detailed description below.

DETAILED DESCRIPTION

Figure 1:
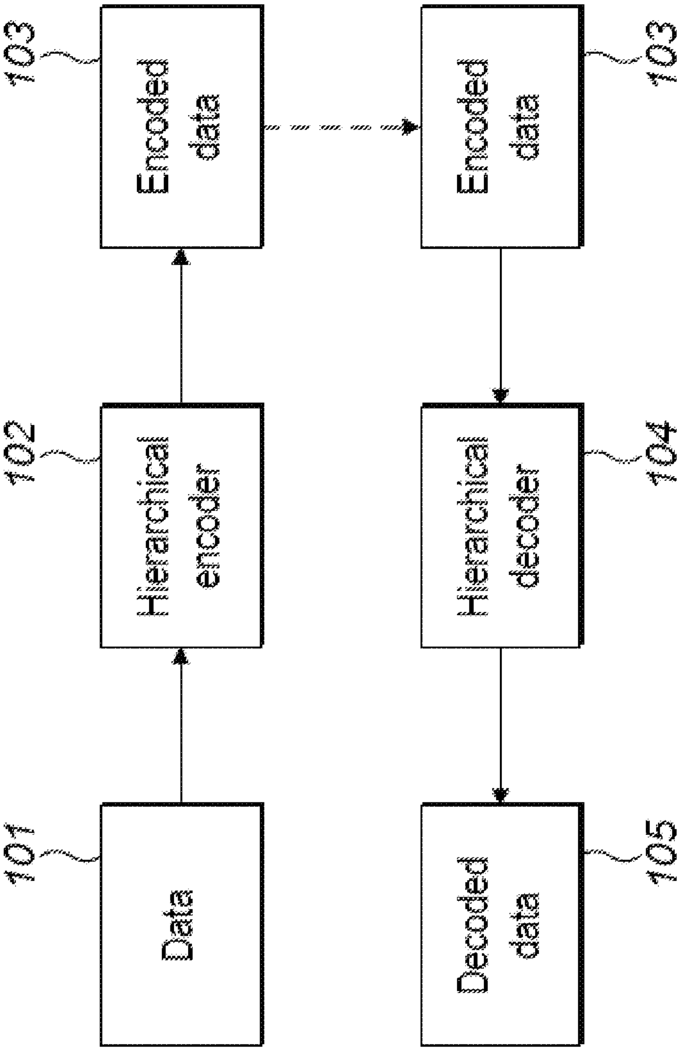
FIG. 1 shows a high-level schematic of a hierarchical encoding and decoding process.

Certain examples described herein relate to methods for encoding signals. Processing data may include, but is not limited to, obtaining, deriving, outputting, receiving and reconstructing data.

According to an aspect of the invention, there is provided a method for video encoding. The method comprises receiving an indication of a desired video output property from a rendering platform. Decoding one or more received video streams into a reconstructed video out stream, wherein post-processing is applied prior to output of the reconstructed video stream. The method further comprises applying a sample conversion from the reconstructed video output stream property to the desired video output property prior to the post-processing when the desired video output property differs from the reconstructed video output stream property. The property may comprise a spatial resolution and/or a bit-depth.

The post-processing may be applied dynamically and content-adaptively to tailor the post-processing to specific applications.

The sample conversion may comprise upsampling a reconstructed video output stream resolution to a desired output resolution. The upsampling may comprise one of non-linear upsampling, neural network upsampling or fractional upsampling to allow for customised resolution ratios.

The post-processing comprises dithering. Wherein the method comprises receiving one or more of a dithering type and a dithering strength. Wherein the dithering strength may be set based on at least one of a determination of contrast or a determination of frame content.

The method comprises receiving a parameter that indicates the base quantisation parameter—QP—value to start applying the dither.

The method comprises receiving a parameter that indicates the base QP value at which to saturate the dither.

The method comprises receiving an input to enable or disable the dithering. Wherein the input may be a binary input but other forms of inputs may be used.

There is provided a system or an apparatus for video decoding configured to perform the method detailed above.

The decoding may be achieved using one or more decoders comprising one or more of AV1, VVC, AVC and LCEVC.

The one or more decoders may be implemented using native/OS functions.

The system or apparatus comprises a decoder integration layer and one or more decoder plug-ins. A control interface may form part of the decoder integration layer. The one or more decoder plug-ins may provide an interface to the one or more decoders.

The post-processing may be achieved using a post-processing module and the sample conversion may be achieved using a sample conversion module, wherein at least one of the post-processing module or the sample conversion module form part of one or more of the decoder integration layer and the one or more decoder plug-ins.

The one or more decoders may comprise a decoder to implement a base decode layer to decode a video stream and an enhancement decoder to implement an enhancement decode layer. The base decode layer may comprise a base decoder. The base decoder may be hardware accelerated and comprise a legacy codec that is implemented using a native or operating system function. The enhancement decoder may comprise an LCEVC decoder.

The enhancement decoder may be configured to receive an encoded enhancement stream. The enhancement decoder may also be configured to decode the encoded enhancement stream to obtain one or more layers of residual data. The one or more layers of residual data being generated based on a comparison of data derived from a decoded video stream and data derived from an original input video stream.

The decoder integration layer may control the operation of the one or more decoder plug-ins and the enhancement decoder to generate the reconstructed video output stream using a decoded video stream from the base decode layer and the one or more layers of residual data from the enhancement decode layer.

The rendering platform may be a client application on a client computing device and the control interface may be an application programming interface—API—accessible to the client application.

The post-processing may be enabled or disabled via the control interface by the rendering platform.

The desired output resolution is communicated from the rendering platform via the control interface.

There is provided a computer-readable medium comprising instruction which when executed cause a processor to perform the method detailed above.

Introduction

Examples described herein relate to signal processing. A signal may be considered as a sequence of samples (i.e., two-dimensional images, video frames, video fields, sound frames, etc.). In the description, the terms "image", "picture" or "plane" (intended with the broadest meaning of "hyper-plane", i.e., array of elements with any number of dimensions and a given sampling grid) will be often used to identify the digital rendition of a sample of the signal along the sequence of samples, wherein each plane has a given resolution for each of its dimensions (e.g., X and Y), and comprises a set of plane elements (or "element", or "pel", or display element for two-dimensional images often called "pixel", for volumetric images often called "voxel", etc.) characterized by one or more "values" or "settings" (e.g., by ways of non-limiting examples, colour settings in a suitable colour space, settings indicating density levels, settings indicating temperature levels, settings indicating audio pitch, settings indicating amplitude, settings indicating depth, settings indicating alpha channel transparency level, etc.). Each plane element is identified by a suitable set of coordinates, indicating the integer positions of said element in the sampling grid of the image. Signal dimensions can include only spatial dimensions (e.g., in the case of an image) or also a time dimension (e.g., in the case of a signal evolving over time, such as a video signal).

As examples, a signal can be an image, an audio signal, a multi-channel audio signal, a telemetry signal, a video signal, a 3DoF/6DoF video signal, a volumetric signal (e.g., medical imaging, scientific imaging, holographic imaging, etc.), a volumetric video signal, or even signals with more than four dimensions.

For simplicity, examples described herein often refer to signals that are displayed as 2D planes of settings (e.g., 2D images in a suitable colour space), such as for instance a video signal. The terms "frame" or "field" will be used interchangeably with the term "image", so as to indicate a sample in time of the video signal: any concepts and methods illustrated for video signals made of frames (progressive video signals) can be easily applicable also to video signals made of fields (interlaced video signals), and vice versa. Despite the focus of embodiments illustrated herein on image and video signals, people skilled in the art can easily understand that the same concepts and methods are also applicable to any other types of multidimensional signal (e.g., audio signals, volumetric signals, stereoscopic video signals, 3DoF/6DoF video signals, plenoptic signals, point clouds, etc.).

Certain tier-based hierarchical formats described herein use a varying amount of correction (e.g., in the form of also "residual data", or simply "residuals") in order to generate a reconstruction of the signal at the given level of quality that best resembles (or even losslessly reconstructs) the original. The amount of correction may be based on a fidelity of a predicted rendition of a given level of quality.

In order to achieve a high-fidelity reconstruction, coding methods may upsample a lower resolution reconstruction of the signal to the next higher resolution reconstruction of the signal. In certain case, different signals may be best processed with different methods, i.e., a same method may not be optimal for all signals.

In addition, it has been determined that non-linear methods may be more effective than more conventional linear kernels (especially separable ones), but at the cost of increased processing power requirements.

Examples of a Tier-Based Hierarchical Coding Scheme or Format

In preferred examples, the encoders or decoders are part of a tier-based hierarchical coding scheme or format. Examples of a tier-based hierarchical coding scheme include LCEVC: MPEG-5 Part 2 LCEVC ("Low Complexity Enhancement Video Coding") and VC-6: SMPTE VC-6 ST-2117, the former being described in PCT/GB2020/050695—published as WO2020/188273 (and the associated standard document) and the latter being described in PCT/GB2018/053552—published as WO2019/111010 (and the associated standard document), all of which are incorporated by reference herein. However, the concepts illustrated herein need not be limited to these specific hierarchical coding schemes.

Figure 4:
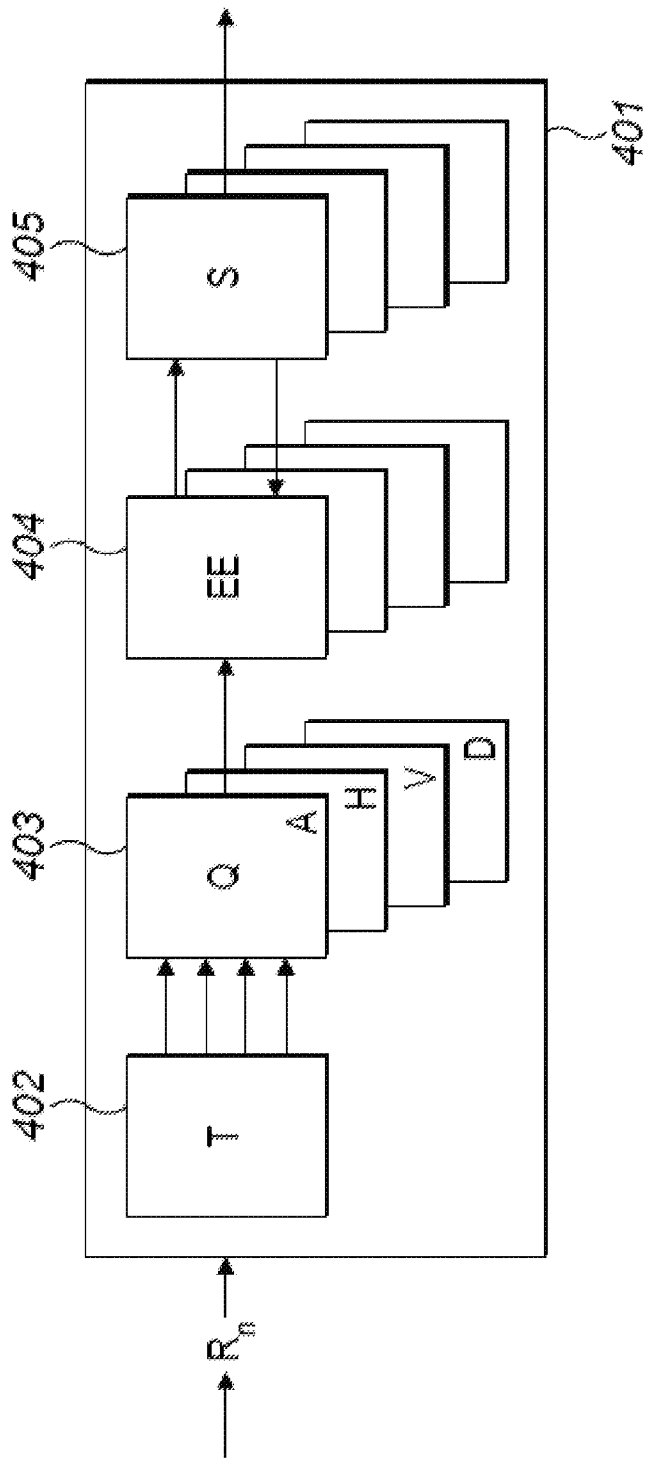
FIG. 4 shows a high-level schematic of an encoding process suitable for encoding the residuals of tiered outputs.
Figure 5:
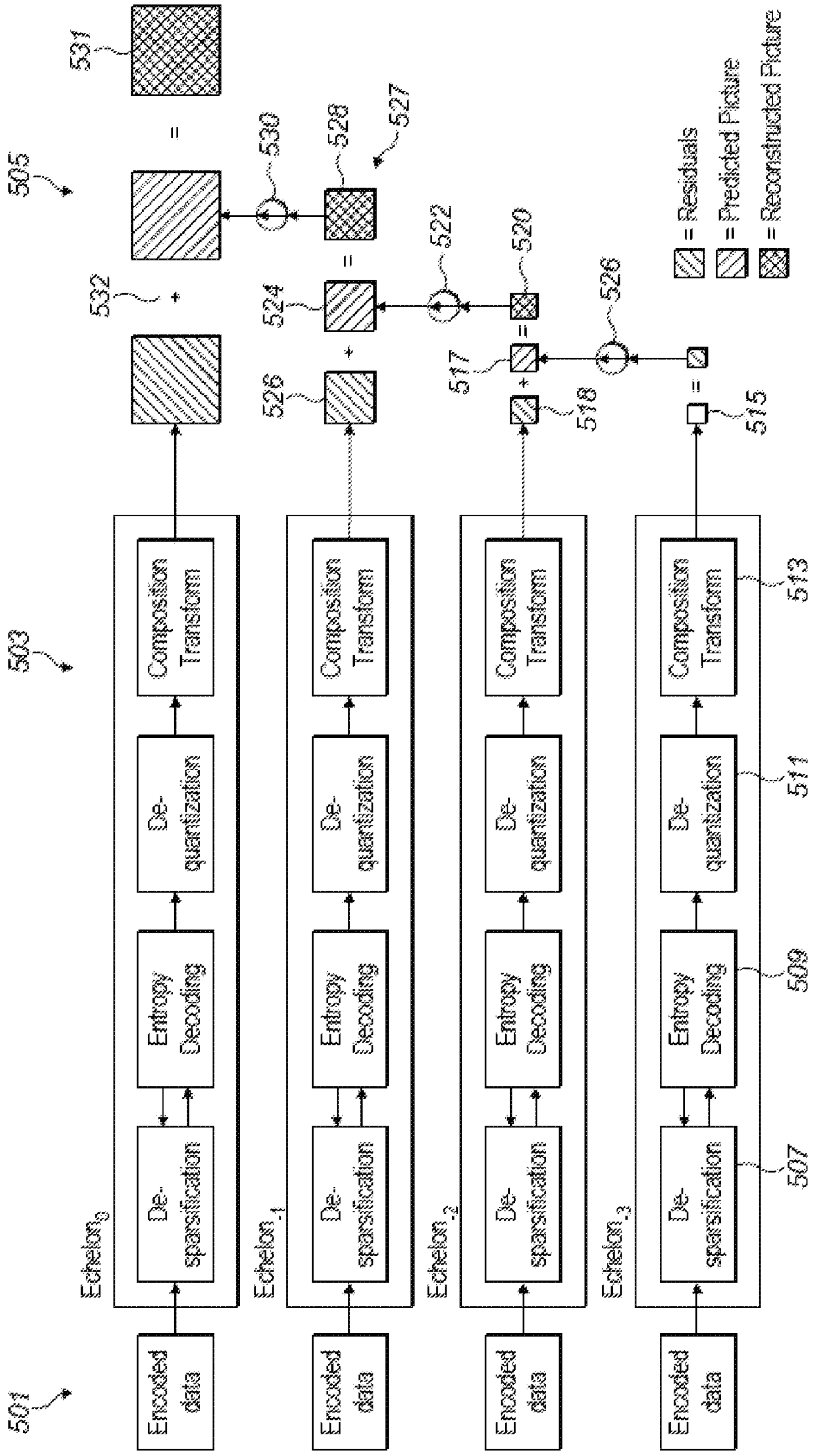
FIG. 5 shows a high-level schematic of a hierarchical decoding process suitable for decoding each output level from FIG. 4.
Figure 6:
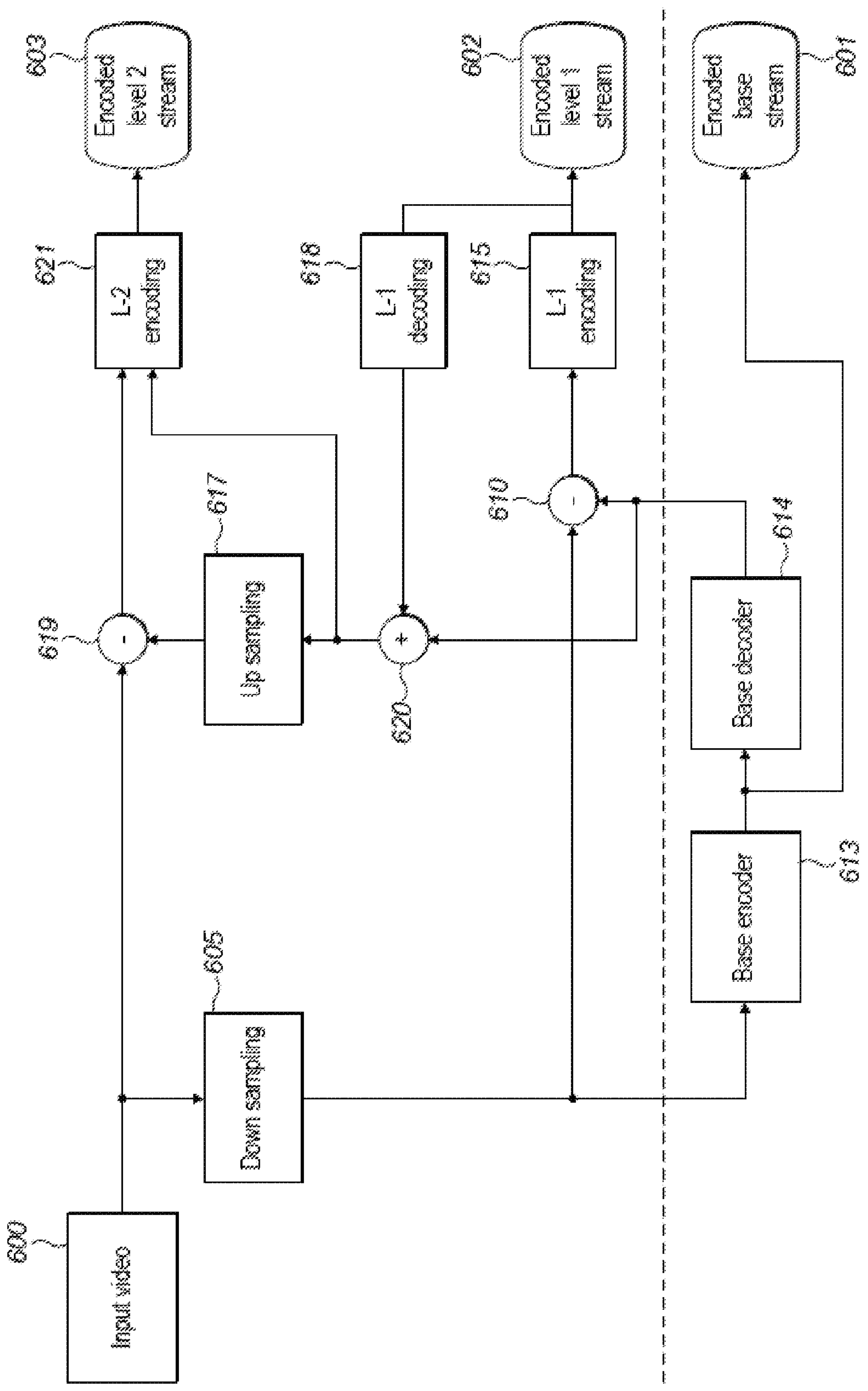
FIG. 6 shows a high-level schematic of an encoding process of a hierarchical coding technology; and, FIG. 7 shows a high-level schematic of a decoding process suitable for decoding the output of FIG. 6.
Figure 7:
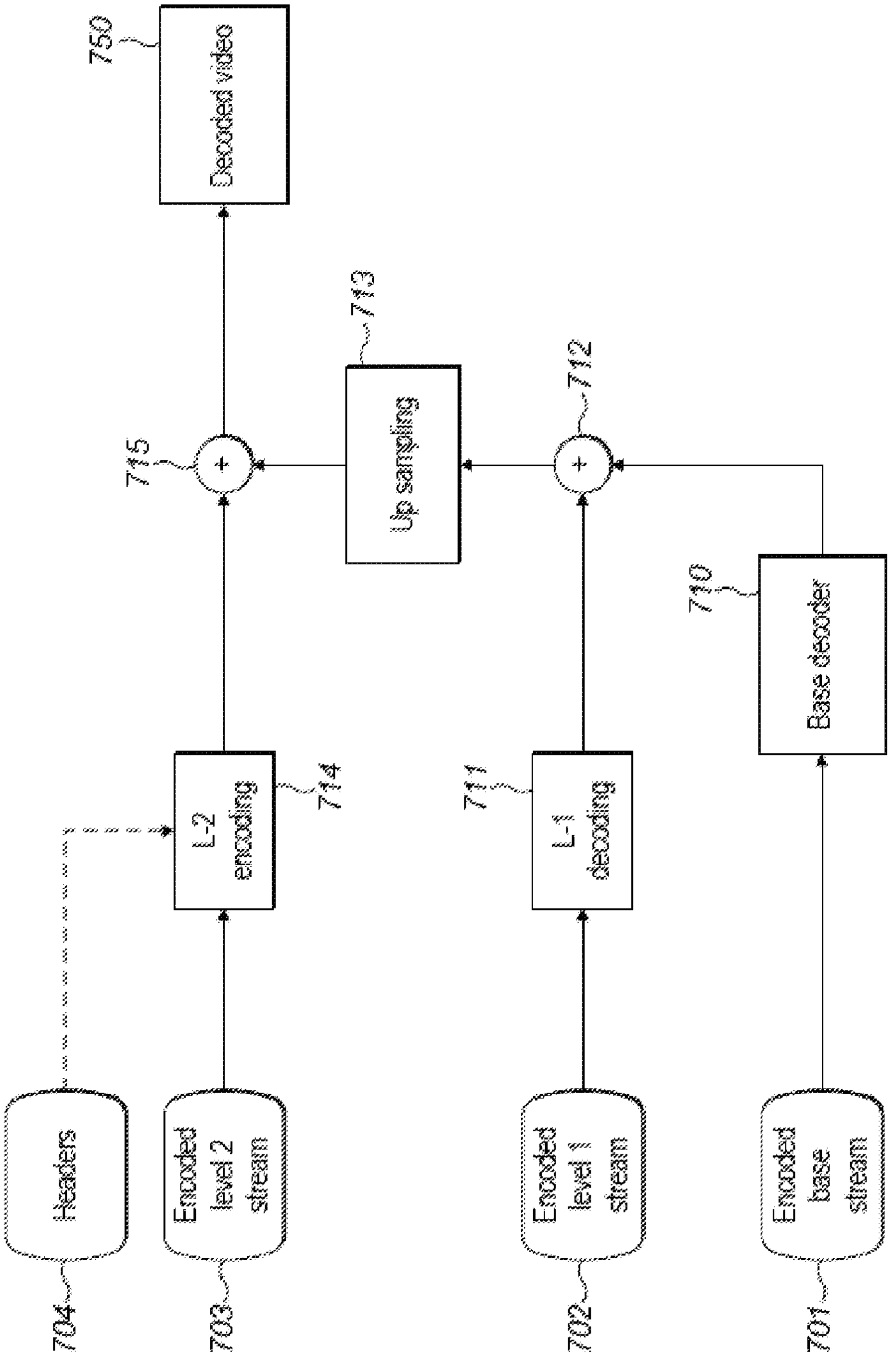

FIG. 1 to FIG. 7 provide an overview of different example tier-based hierarchical coding formats. These are provided as context for the addition of further signal processing operations, which are set out in the Figures following FIG. 7. FIG. 1 to FIG. 5 provide examples similar to the implementation of SMPTE VC-6 ST-2117, whereas FIG. 6 and FIG. 7 provide examples similar to the implementation of MPEG-5 Part 2 LCEVC. It may be seen that both sets of examples utilise common underlying operations (e.g., down-sampling, upsampling and residual generation) and may share modular implementing technologies.

FIG. 1 illustrates, very generally, a hierarchical coding scheme. Data to be encoded 101 is retrieved by a hierarchical encoder 102 which outputs encoded data 103. Subsequently, the encoded data 103 is received by a hierarchical decoder 104 which decodes the data and outputs decoded data 105.

Typically, the hierarchical coding schemes used in examples herein create a base or core level, which is a representation of the original data at a lower level of quality and one or more levels of residuals which can be used to recreate the original data at a higher level of quality using a decoded version of the base level data. In general, the term "residuals" as used herein refers to a difference between a value of a reference array or reference frame and an actual array or frame of data. The array may be a one or two-dimensional array that represents a coding unit. For example, a coding unit may be a 2×2 or 4×4 set of residual values that correspond to similar sized areas of an input video frame.

It should be noted that the generalised examples are agnostic as to the nature of the input signal. Reference to "residual data" as used herein refers to data derived from a set of residuals, e.g. a set of residuals themselves or an output of a set of data processing operations that are performed on the set of residuals. Throughout the present description, generally a set of residuals includes a plurality of residuals or residual elements, each residual or residual element corresponding to a signal element, that is, an element of the signal or original data.

In specific examples, the data may be an image or video. In these examples, the set of residuals corresponds to an image or frame of the video, with each residual being associated with a pixel of the signal, the pixel being the signal element.

The methods described herein may be applied to so-called planes of data that reflect different colour components of a video signal. For example, the methods may be applied to different planes of YUV or RGB data reflecting different colour channels. Different colour channels may be processed in parallel. The components of each stream may be collated in any logical order.

A hierarchical coding scheme will now be described in which the concepts of the invention may be deployed. The scheme is conceptually illustrated in FIG. 2 to FIG. 5 and corresponds generally to VC-6 described above. In such encoding techniques, residuals data is used in progressively higher levels of quality. In this proposed technique, a core layer represents the image at a first resolution and subsequent layers in the tiered hierarchy are residual data or adjustment layers necessary for the decoding side to reconstruct the image at a higher resolution. Each layer or level may be referred to as an echelon index, such that the residuals data is data required to correct low quality information present in a lower echelon index. Each layer or echelon index in this hierarchical technique, particularly each residual layer, is often a comparatively sparse data set having many zero value elements. When reference is made to an echelon index, it refers collectively to all echelons or sets of components at that level, for example, all subsets arising from a transform step performed at that level of quality.

In this particular hierarchical manner, the described data structure removes any requirement for, or dependency on, the preceding or proceeding level of quality. A level of quality may be encoded and decoded separately, and without reference to any other layer. Thus, in contrast to many known other hierarchical encoding schemes, where there is a requirement to decode the lowest level of quality in order to decode any higher levels of quality, the described methodology does not require the decoding of any other layer. Nevertheless, the principles of exchanging information described below may also be applicable to other hierarchical coding schemes.

Figure 2:
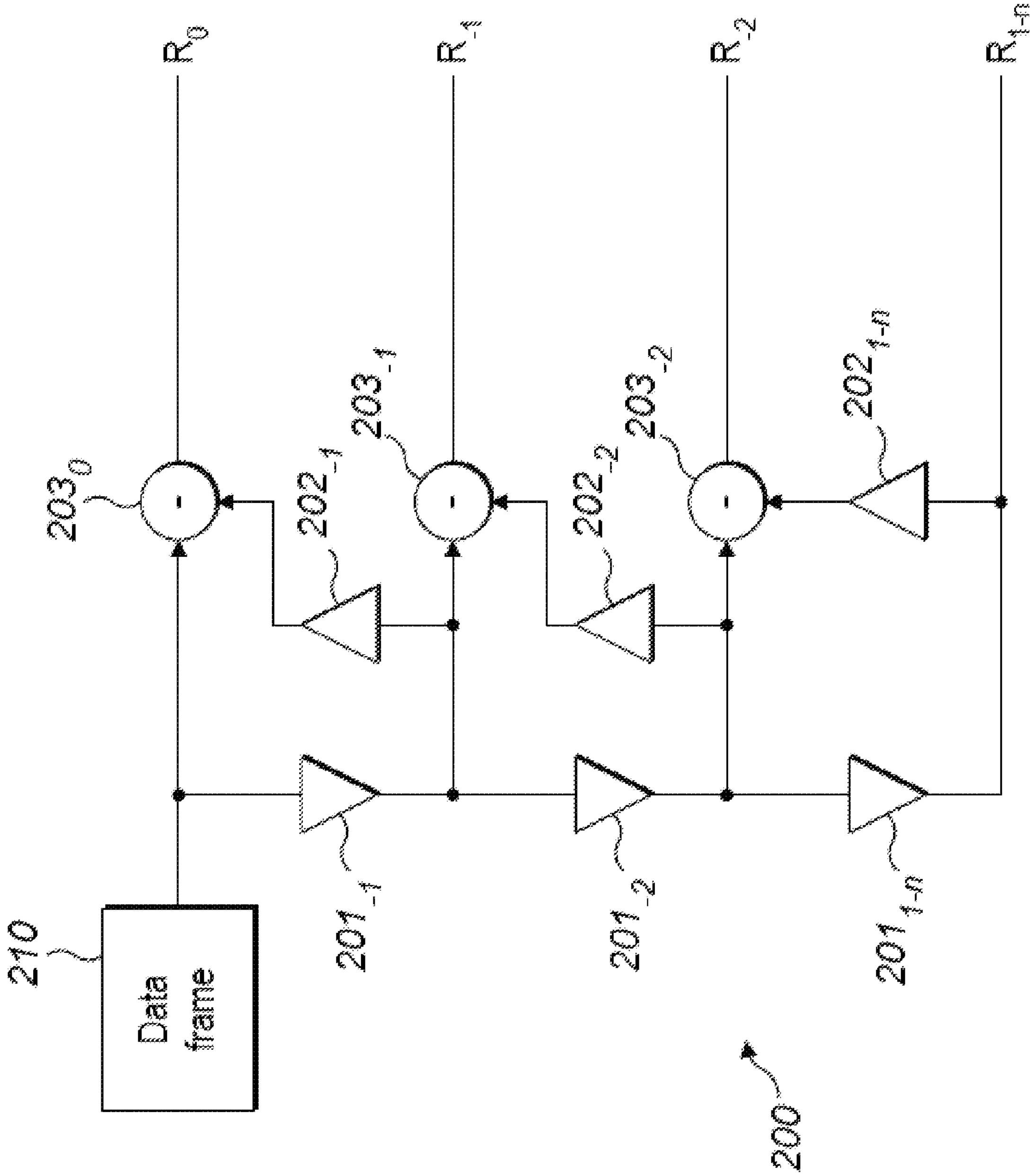
FIG. 2 shows a high-level schematic of a hierarchical deconstruction process.

As shown in FIG. 2, the encoded data represents a set of layers or levels, generally referred to here as echelon indices. The base or core level represents the original data frame 210, albeit at the lowest level of quality or resolution and the subsequent residuals data echelons can combine with the data at the core echelon index to recreate the original image at progressively higher resolutions.

To create the core-echelon index, an input data frame 210 may be down-sampled using a number of down-sampling operations 201 corresponding to the number of levels or echelon indices to be used in the hierarchical coding operation. One fewer down-sampling operation 201 is required than the number of levels in the hierarchy. In all examples illustrated herein, there are 4 levels or echelon indices of output encoded data and accordingly 3 down-sampling operations, but it will of course be understood that these are merely for illustration. Where n indicates the number of levels, the number of down-samplers is n−1. The core level $R_{1-n}$ is the output of the third down-sampling operation. As indicated above, the core level $R_{1-n}$ corresponds to a representation of the input data frame at a lowest level of quality.

To distinguish between down-sampling operations 201, each will be referred to in the order in which the operation is performed on the input data 210 or by the data which its output represents. For example, the third down-sampling operation $\mathbf{201}_{1\text{-}n}$ in the example may also be referred to as the core down-sampler as its output generates the core-echelon index or $\text{echelon}_{1\text{-}n}$, that is, the index of all echelons at this level is 1-n. Thus, in this example, the first down-sampling operation $\mathbf{201}_{-1}$ corresponds to the $R_{-1}$ down-sampler, the second down-sampling operation $\mathbf{201}_{-2}$ corresponds to the $R_{-2}$ down-sampler and the third down-sampling operation $\mathbf{201}_{1\text{-}n}$ corresponds to the core or $R_{-3}$ down-sampler.

As shown in FIG. 2, the data representing the core level of quality $R_{1\text{-}n}$ undergoes an up-sampling operation $\mathbf{202}_{1\text{-}n}$, referred to here as the core up-sampler. A difference $\mathbf{203}_{-2}$ between the output of the second down-sampling operation $\mathbf{201}_{-2}$ (the output of the $R_{-2}$ down-sampler, i.e. the input to the core down-sampler) and the output of the core up-sampler $\mathbf{202}_{1\text{-}n}$ is output as the first residuals data $R_{-2}$. This first residuals data $R_{-2}$ is accordingly representative of the error between the core level $R_{-3}$ and the signal that was used to create that level. Since that signal has itself undergone two down-sampling operations in this example, the first residuals data $R_{-2}$ is an adjustment layer which can be used to recreate the original signal at a higher level of quality than the core level of quality but a lower level than the input data frame 210.

Figure 3:
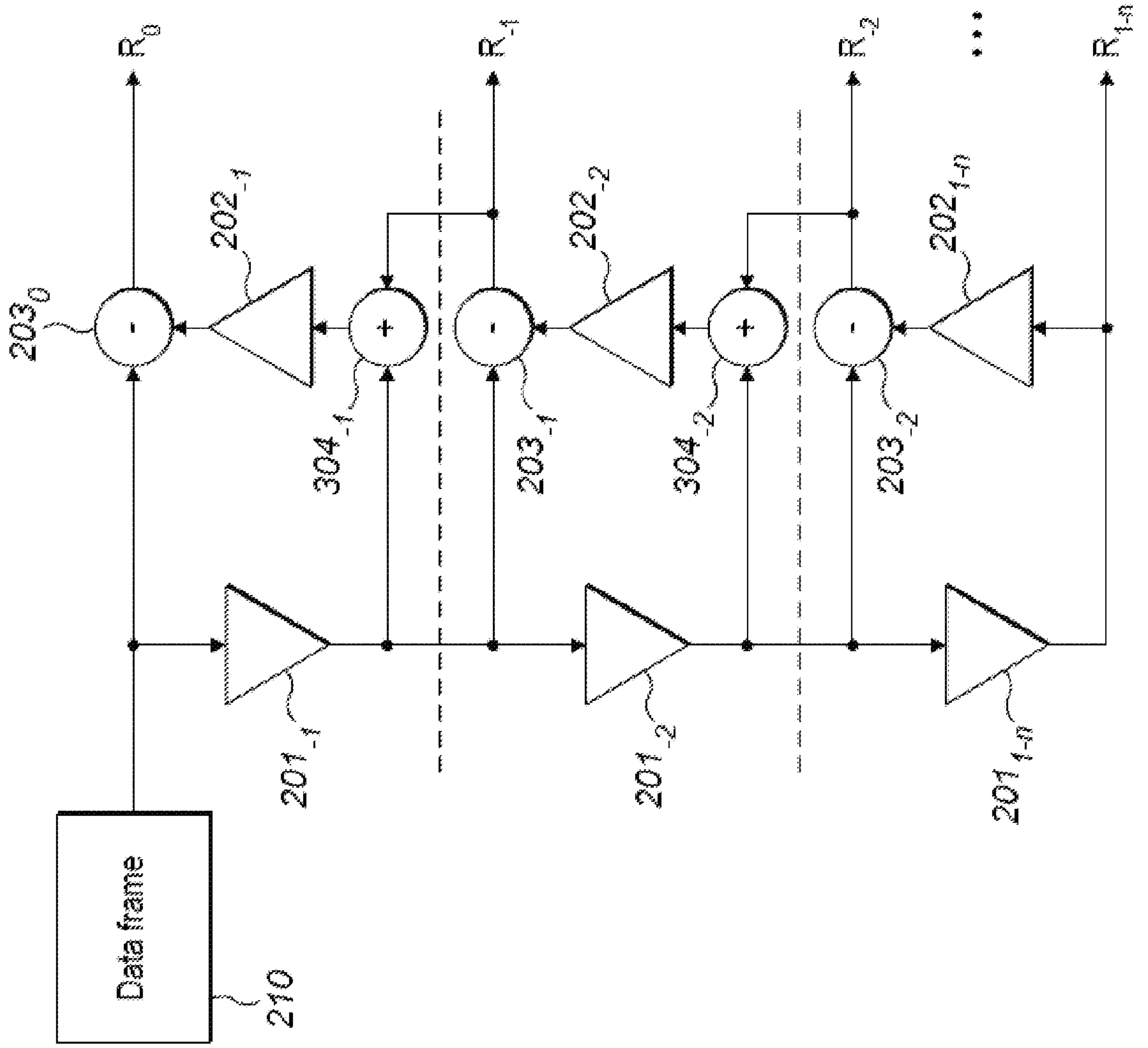
FIG. 3 shows an alternative high-level schematic of a hierarchical deconstruction process.

Variations in how to create residuals data representing higher levels of quality are conceptually illustrated in FIG. 2 and FIG. 3.

In FIG. 2, the output of the second down-sampling operation $\mathbf{201}_{-2}$ (or $R_{-2}$ down-sampler, i.e. the signal used to create the first residuals data $R_{-2}$), is up-sampled $\mathbf{202}_{-2}$ and the difference $\mathbf{203}_{-1}$ between the input to the second down-sampling operation $\mathbf{201}_{-2}$ (or $R_{-2}$ down-sampler, i.e. the output of the $R_{-1}$ down-sampler) is calculated in much the same way as the first residuals data $R_{-2}$ is created. This difference is accordingly the second residuals data $R_{-1}$ and represents an adjustment layer which can be used to recreate the original signal at a higher level of quality using the data from the lower layers.

In the variation of FIG. 3, however, the output of the second down-sampling operation $\mathbf{201}_{-2}$ (or $R_{-2}$ down-sampler) is combined or summed $\mathbf{304}_{-2}$ with the first residuals data $R_{-2}$ to recreate the output of the core up-sampler $\mathbf{202}_{1\text{-}n}$. In this variation it is this recreated data which is up-sampled $\mathbf{202}_{-2}$ rather than the down-sampled data. The up-sampled data is similarly compared $\mathbf{203}_{-1}$ to the input to the second down-sampling operation (or $R_{-2}$ down-sampler, i.e. the output of the $R_{-1}$ down-sampler) to create the second residuals data $R_{-1}$.

The variation between the implementations of FIG. 2 and FIG. 3 results in slight variations in the residuals data between the two implementations. FIG. 2 benefits from greater potential for parallelisation.

The process or cycle repeats to create the third residuals $R_0$. In the examples of FIG. 2 and FIG. 3, the output residuals data $R_0$ (i.e. the third residuals data) corresponds to the highest level and is used at the decoder to recreate the input data frame. At this level the difference operation is based on the input data frame which is the same as the input to the first down-sampling operation.

FIG. 4 illustrates an example encoding process 401 for encoding each of the levels or echelon indices of data to produce a set of encoded echelons of data having an echelon index. This encoding process is used merely for example of a suitable encoding process for encoding each of the levels, but it will be understood that any suitable encoding process may be used. The input to the process is a respective level of residuals data output from FIG. 2 or FIG. 3 and the output is a set of echelons of encoded residuals data, the echelons of encoded residuals data together hierarchically represent the encoded data.

In a first step, a transform 402 is performed. The transform may be directional decomposition transform as described in PCT/EP2013/059847—published as WO2013/171173 or a wavelet or discrete cosine transform. If a directional decomposition transform is used, there may be output a set of four components (also referred to as transformed coefficients). When reference is made to an echelon index, it refers collectively to all directions (A, H, V, D), i.e., 4 echelons. The component set is then quantized 403 before entropy encoding. In this example, the entropy encoding operation 404 is coupled to a sparsification step 405 which takes advantage of the sparseness of the residuals data to reduce the overall data size and involves mapping data elements to an ordered quadtree. Such coupling of entropy coding and sparsification is described further in WO2019/111004 but the precise details of such a process is not relevant to the understanding of the invention. Each array of residuals may be thought of as an echelon.

The process set out above corresponds to an encoding process suitable for encoding data for reconstruction according to SMPTE ST 2117, VC-6 Multiplanar Picture Format. VC-6 is a flexible, multi-resolution, intra-only bitstream format, capable of compressing any ordered set of integer element grids, each of independent size but is also designed for picture compression. It employs data agnostic techniques for compression and is capable of compressing low or high bit-depth pictures. The bitstream's headers can contain a variety of metadata about the picture.

As will be understood, each echelon or echelon index may be implemented using a separate encoder or encoding operation. Similarly, an encoding module may be divided into the steps of down-sampling and comparing, to produce the residuals data, and subsequently encoding the residuals or alternatively each of the steps of the echelon may be implemented in a combined encoding module. Thus, the process may be for example be implemented using 4 encoders, one for each echelon index, 1 encoder and a plurality of encoding modules operating in parallel or series, or one encoder operating on different data sets repeatedly.

The following sets out an example of reconstructing an original data frame, the data frame having been encoded using the above exemplary process. This reconstruction process may be referred to as pyramidal reconstruction. Advantageously, the method provides an efficient technique for reconstructing an image encoded in a received set of data, which may be received by way of a data stream, for example, by way of individually decoding different component sets corresponding to different image size or resolution levels, and combining the image detail from one decoded component set with the upscaled decoded image data from a lower-resolution component set. Thus by performing this process for two or more component sets, digital images at the structure or detail therein may be reconstructed for progressively higher resolutions or greater numbers of pixels, without requiring the full or complete image detail of the highest-resolution component set to be received. Rather, the method facilitates the progressive addition of increasingly higher-resolution details while reconstructing an image from a lower-resolution component set, in a staged manner.

Moreover, the decoding of each component set separately facilitates the parallel processing of received component sets, thus improving reconstruction speed and efficiency in implementations wherein a plurality of processes is available.

Each resolution level corresponds to a level of quality or echelon index. This is a collective term, associated with a plane (in this example a representation of a grid of integer value elements) that describes all new inputs or received component sets, and the output reconstructed image for a cycle of index-m. The reconstructed image in echelon index zero, for instance, is the output of the final cycle of pyramidal reconstruction.

Pyramidal reconstruction may be a process of reconstructing an inverted pyramid starting from the initial echelon index and using cycles by new residuals to derive higher echelon indices up to the maximum quality, quality zero, at echelon index zero. A cycle may be thought of as a step in such pyramidal reconstruction, the step being identified by an index-m. The step typically comprises up-sampling data output from a possible previous step, for instance, upscaling the decoded first component set, and takes new residual data as further inputs in order to obtain output data to be up-sampled in a possible following step. Where only first and second component sets are received, the number of echelon indices will be two, and no possible following step is present. However, in examples where the number of component sets, or echelon indices, is three or greater, then the output data may be progressively upsampled in the following steps.

The first component set typically corresponds to the initial echelon index, which may be denoted by echelon index 1-N, where N is the number of echelon indices in the plane.

Typically, the upscaling of the decoded first component set comprises applying an upsampler to the output of the decoding procedure for the initial echelon index. In examples, this involves bringing the resolution of a reconstructed picture output from the decoding of the initial echelon index component set into conformity with the resolution of the second component set, corresponding to 2-N. Typically, the upscaled output from the lower echelon index component set corresponds to a predicted image at the higher echelon index resolution. Owing to the lower-resolution initial echelon index image and the up-sampling process, the predicted image typically corresponds to a smoothed or blurred picture.

Adding to this predicted picture higher-resolution details from the echelon index above provides a combined, reconstructed image set. Advantageously, where the received component sets for one or more higher-echelon index component sets comprise residual image data, or data indicating the pixel value differences between upscaled predicted pictures and original, uncompressed, or pre-encoding images, the amount of received data required in order to reconstruct an image or data set of a given resolution or quality may be considerably less than the amount or rate of data that would be required in order to receive the same quality image using other techniques. Thus, by combining low-detail image data received at lower resolutions with progressively greater-detail image data received at increasingly higher resolutions in accordance with the method, data rate requirements are reduced.

Typically, the set of encoded data comprises one or more further component sets, wherein each of the one or more further component sets corresponds to a higher image resolution than the second component set, and wherein each of the one or more further component sets corresponds to a progressively higher image resolution, the method comprising, for each of the one or more further component sets, decoding the component set so as to obtain a decoded set, the method further comprising, for each of the one or more further component sets, in ascending order of corresponding image resolution: upscaling the reconstructed set having the highest corresponding image resolution so as to increase the corresponding image resolution of the reconstructed set to be equal to the corresponding image resolution of the further component set, and combining the reconstructed set and the further component set together so as to produce a further reconstructed set.

In this way, the method may involve taking the reconstructed image output of a given component set level or echelon index, upscaling that reconstructed set, and combining it with the decoded output of the component set or echelon index above, to produce a new, higher resolution reconstructed picture. It will be understood that this may be performed repeatedly, for progressively higher echelon indices, depending on the total number of component sets in the received set.

In typical examples, each of the component sets corresponds to a progressively higher image resolution, wherein each progressively higher image resolution corresponds to a factor-of-four increase in the number of pixels in a corresponding image. Typically, therefore, the image size corresponding to a given component set is four times the size or number of pixels, or double the height and double the width, of the image corresponding to the component set below, that is the component set with the echelon index one less than the echelon index in question. A received set of component sets in which the linear size of each corresponding image is double with respect to the image size below may facilitate more simple upscaling operations, for example.

In the illustrated example, the number of further component sets is two. Thus, the total number of component sets in the received set is four. This corresponds to the initial echelon index being echelon−3.

The first component set may correspond to image data, and the second and any further component sets correspond to residual image data. As noted above, the method provides particularly advantageous data rate requirement reductions for a given image size in cases where the lowest echelon index, that is the first component set, contains a low resolution, or down sampled, version of the image being transmitted. In this way, with each cycle of reconstruction, starting with a low resolution image, that image is upscaled so as to produce a high resolution albeit smoothed version, and that image is then improved by way of adding the differences between that upscaled predicted picture and the actual image to be transmitted at that resolution, and this additive improvement may be repeated for each cycle. Therefore, each component set above that of the initial echelon index needs only contain residual data in order to reintroduce the information that may have been lost in down sampling the original image to the lowest echelon index.

The method provides a way of obtaining image data, which may be residual data, upon receipt of a set containing data that has been compressed, for example, by way of decomposition, quantization, entropy-encoding, and sparsification, for instance. The sparsification step is particularly advantageous when used in connection with sets for which the original or pre-transmission data was sparse, which may typically correspond to residual image data. A residual may be a difference between elements of a first image and elements of a second image, typically co-located. Such residual image data may typically have a high degree of sparseness. This may be thought of as corresponding to an image wherein areas of detail are sparsely distributed amongst areas in which details are minimal, negligible, or absent. Such sparse data may be described as an array of data wherein the data are organised in at least a two-dimensional structure (e.g., a grid), and wherein a large portion of the data so organised are zero (logically or numerically) or are considered to be below a certain threshold. Residual data are just one example. Additionally, metadata may be sparse and so be reduced in size to a significant degree by this process. Sending data that has been sparsified allows a significant reduction in required data rate to be achieved by way of omitting to send such sparse areas, and instead reintroducing them at appropriate locations within a received byteset at a decoder.

Typically, the entropy-decoding, de-quantizing, and directional composition transform steps are performed in accordance with parameters defined by an encoder or a node from which the received set of encoded data is sent. For each echelon index, or component set, the steps serve to decode image data so as to arrive at a set which may be combined with different echelon indices as per the technique disclosed above, while allowing the set for each level to be transmitted in a data-efficient manner.

There may also be provided a method of reconstructing a set of encoded data according to the method disclosed above, wherein the decoding of each of the first and second component sets is performed according to the method disclosed above. Thus, the advantageous decoding method of the present disclosure may be utilised for each component set or echelon index in a received set of image data and reconstructed accordingly.

With reference to FIG. 5, a decoding example is now described. A set of encoded data 501 is received, wherein the set comprises four echelon indices, each echelon index comprising four echelons: from $echelon_0$, the highest resolution or level of quality, to $echelon_{-3}$, the initial echelon. The image data carried in the $echelon_{-3}$ component set corresponds to image data, and the other component sets contain residual data for that transmitted image. While each of the levels may output data that can be considered as residuals, the residuals in the initial echelon level, that is $echelon_{-3}$, effectively correspond to the actual reconstructed image. At stage 503, each of the component sets is processed in parallel so as to decode that encoded set.

With reference to the initial echelon index, or the core-echelon index, the following decoding steps are carried out for each component set $echelon_{-3}$ to $echelon_0$.

At step 507, the component set is de-sparsified. De-sparsification may be an optional step that is not performed in other tier-based hierarchical formats. In this example, the de-sparsification causes a sparse two-dimensional array to be recreated from the encoded byteset received at each echelon. Zero values grouped at locations within the two-dimensional array which were not received (owing to there being omitted from the transmitted byteset in order to reduce the quantity of data transmitted) are repopulated by this process. Non-zero values in the array retain their correct values and positions within the recreated two-dimensional array, with the de-sparsification step repopulating the transmitted zero values at the appropriate locations or groups of locations there between.

At step 509, a range decoder, the configured parameters of which correspond to those using which the transmitted data was encoded prior to transmission, is applied to the de-sparsified set at each echelon in order to substitute the encoded symbols within the array with pixel values. The encoded symbols in the received set are substituted for pixel values in accordance with an approximation of the pixel value distribution for the image. The use of an approximation of the distribution, that is relative frequency of each value across all pixel values in the image, rather than the true distribution, permits a reduction in the amount of data required to decode the set, since the distribution information is required by the range decoder in order to carry out this step. As described in the present disclosure, the steps of de-sparsification and range decoding are interdependent, rather than sequential. This is indicated by the loop formed by the arrows in the flow diagram.

At step 511, the array of values is de-quantized. This process is again carried out in accordance with the parameters with which the decomposed image was quantized prior to transmission.

Following de-quantization, the set is transformed at step 513 by a composition transform which comprises applying an inverse directional decomposition operation to the de-quantized array. This causes the directional filtering, according to an operator set comprising average, horizontal, vertical, and diagonal operators, to be reversed, such that the resultant array is image data for $echelon_{-3}$ and residual data for $echelon_{-2}$ to $echelon_0$.

Stage 505 illustrates the several cycles involved in the reconstruction utilising the output of the composition transform for each of the echelon component sets 501. Stage 515 indicates the reconstructed image data output from the decoder 503 for the initial echelon. In an example, the reconstructed picture 515 has a resolution of 64×64. At 516, this reconstructed picture is up-sampled so as to increase its constituent number of pixels by a factor of four, thereby a predicted picture 517 having a resolution of 128×128 is produced. At stage 520, the predicted picture 517 is added to the decoded residuals 518 from the output of the decoder at $echelon_{-2}$. The addition of these two 128×128-size images produces a 128×128-size reconstructed image, containing the smoothed image detail from the initial echelon enhanced by the higher-resolution detail of the residuals from $echelon_{-2}$. This resultant reconstructed picture 519 may be output or displayed if the required output resolution is that corresponding to $echelon_{-2}$. In the present example, the reconstructed picture 519 is used for a further cycle. At step 512, the reconstructed image 519 is up-sampled in the same manner as at step 516, so as to produce a 256×256-size predicted picture 524. This is then combined at step 528 with the decoded $echelon_{-1}$ output 526, thereby producing a 256×256-size reconstructed picture 527 which is an upscaled version of prediction 519 enhanced with the higher-resolution details of residuals 526. At 530 this process is repeated a final time, and the reconstructed picture 527 is upscaled to a resolution of 512×512, for combination with the echelon0 residual at stage 532. Thereby a 512×512 reconstructed picture 531 is obtained.

A further hierarchical coding technology with which the principles of the present disclosure may be utilised is illustrated in FIG. 6 and FIG. 7. This technology is a flexible, adaptable, highly efficient and computationally inexpensive coding format which combines a different video coding format, a base codec, (e.g., AVC, HEVC, or any other present or future codec) with at least two enhancement levels of coded data.

The general structure of the encoding scheme uses a down-sampled source signal encoded with a base codec, adds a first level of correction data to the decoded output of the base codec to generate a corrected picture, and then adds a further level of enhancement data to an up-sampled version of the corrected picture. Thus, the streams are considered to be a base stream and an enhancement stream, which may be further multiplexed or otherwise combined to generate an encoded data stream. In certain cases, the base stream and the enhancement stream may be transmitted separately. References to an encoded data as described herein may refer to the enhancement stream or a combination of the base stream and the enhancement stream. The base stream may be decoded by a hardware decoder while the enhancement stream is may be suitable for software processing implementation with suitable power consumption. This general encoding structure creates a plurality of degrees of freedom that allow great flexibility and adaptability to many situations, thus making the coding format suitable for many use cases including OTT transmission, live streaming, live ultra-high-definition UHD broadcast, and so on. Although the decoded output of the base codec is not intended for viewing, it is a fully decoded video at a lower resolution, making the output compatible with existing decoders and, where considered suitable, also usable as a lower resolution output.

In certain examples, each or both enhancement streams may be encapsulated into one or more enhancement bitstreams using a set of Network Abstraction Layer Units (NALUs). The NALUs are meant to encapsulate the enhancement bitstream in order to apply the enhancement to the correct base reconstructed frame. The NALU may for example contain a reference index to the NALU containing the base decoder reconstructed frame bitstream to which the enhancement has to be applied. In this way, the enhancement can be synchronised to the base stream and the frames of each bitstream combined to produce the decoded output video (i.e. the residuals of each frame of enhancement level are combined with the frame of the base decoded stream). A group of pictures may represent multiple NALUs.

Returning to the initial process described above, where a base stream is provided along with two levels (or sub-levels) of enhancement within an enhancement stream, an example of a generalised encoding process is depicted in the block diagram of FIG. 6. An input video 600 at an initial resolution is processed to generate various encoded streams 601, 602, 603. A first encoded stream (encoded base stream) is produced by feeding a base codec (e.g., AVC, HEVC, or any other codec) with a down-sampled version of the input video. The encoded base stream may be referred to as the base layer or base level. A second encoded stream (encoded level 1 stream) is produced by processing the residuals obtained by taking the difference between a reconstructed base codec video and the down-sampled version of the input video. A third encoded stream (encoded level 2 stream) is produced by processing the residuals obtained by taking the difference between an up-sampled version of a corrected version of the reconstructed base coded video and the input video. In certain cases, the components of FIG. 6 may provide a general low complexity encoder. In certain cases, the enhancement streams may be generated by encoding processes that form part of the low complexity encoder and the low complexity encoder may be configured to control an independent base encoder and decoder (e.g., as packaged as a base codec). In other cases, the base encoder and decoder may be supplied as part of the low complexity encoder. In one case, the low complexity encoder of FIG. 6 may be seen as a form of wrapper for the base codec, where the functionality of the base codec may be hidden from an entity implementing the low complexity encoder.

A down-sampling operation illustrated by down-sampling component 105 may be applied to the input video to produce a down-sampled video to be encoded by a base encoder 613 of a base codec. The down-sampling can be done either in both vertical and horizontal directions, or alternatively only in the horizontal direction. The base encoder 613 and a base decoder 614 may be implemented by a base codec (e.g., as different functions of a common codec). The base codec, and/or one or more of the base encoder 613 and the base decoder 614 may comprise suitably configured electronic circuitry (e.g., a hardware encoder/decoder) and/or computer program code that is executed by a processor.

Each enhancement stream encoding process may not necessarily include an upsampling step. In FIG. 6 for example, the first enhancement stream is conceptually a correction stream while the second enhancement stream is upsampled to provide a level of enhancement.

Looking at the process of generating the enhancement streams in more detail, to generate the encoded Level 1 stream, the encoded base stream is decoded by the base decoder 614 (i.e. a decoding operation is applied to the encoded base stream to generate a decoded base stream). Decoding may be performed by a decoding function or mode of a base codec. The difference between the decoded base stream and the down-sampled input video is then created at a level 1 comparator 610 (i.e. a subtraction operation is applied to the down-sampled input video and the decoded base stream to generate a first set of residuals). The output of the comparator 610 may be referred to as a first set of residuals, e.g. a surface or frame of residual data, where a residual value is determined for each picture element at the resolution of the base encoder 613, the base decoder 614 and the output of the down-sampling block 605.

The difference is then encoded by a first encoder 615 (i.e. a level 1 encoder) to generate the encoded Level 1 stream 602 (i.e. an encoding operation is applied to the first set of residuals to generate a first enhancement stream).

As noted above, the enhancement stream may comprise a first level of enhancement 602 and a second level of enhancement 603. The first level of enhancement 602 may be considered to be a corrected stream, e.g. a stream that provides a level of correction to the base encoded/decoded video signal at a lower resolution than the input video 600. The second level of enhancement 603 may be considered to be a further level of enhancement that converts the corrected stream to the original input video 600, e.g. that applies a level of enhancement or correction to a signal that is reconstructed from the corrected stream.

In the example of FIG. 6, the second level of enhancement 603 is created by encoding a further set of residuals. The further set of residuals are generated by a level 2 comparator 619. The level 2 comparator 619 determines a difference between an upsampled version of a decoded level 1 stream, e.g. the output of an upsampling component 617, and the input video 600. The input to the up-sampling component 617 is generated by applying a first decoder (i.e. a level 1 decoder) to the output of the first encoder 615. This generates a decoded set of level 1 residuals. These are then combined with the output of the base decoder 614 at summation component 620. This effectively applies the level 1 residuals to the output of the base decoder 614. It allows for losses in the level 1 encoding and decoding process to be corrected by the level 2 residuals. The output of summation component 620 may be seen as a simulated signal that represents an output of applying level 1 processing to the encoded base stream 601 and the encoded level 1 stream 602 at a decoder.

As noted, an upsampled stream is compared to the input video which creates a further set of residuals (i.e. a difference operation is applied to the upsampled re-created stream to generate a further set of residuals). The further set of residuals are then encoded by a second encoder 621 (i.e. a level 2 encoder) as the encoded level 2 enhancement stream (i.e. an encoding operation is then applied to the further set of residuals to generate an encoded further enhancement stream).

Thus, as illustrated in FIG. 6 and described above, the output of the encoding process is a base stream 601 and one or more enhancement streams 602, 603 which preferably comprise a first level of enhancement and a further level of enhancement. The three streams 601, 602 and 603 may be combined, with or without additional information such as control headers, to generate a combined stream for the video encoding framework that represents the input video 600. It should be noted that the components shown in FIG. 6 may operate on blocks or coding units of data, e.g. corresponding to 2×2 or 4×4 portions of a frame at a particular level of resolution. The components operate without any inter-block dependencies, hence they may be applied in parallel to multiple blocks or coding units within a frame. This differs from comparative video encoding schemes wherein there are dependencies between blocks (e.g., either spatial dependencies or temporal dependencies). The dependencies of comparative video encoding schemes limit the level of parallelism and require a much higher complexity.

A corresponding generalised decoding process is depicted in the block diagram of FIG. 7. FIG. 7 may be said to show a low complexity decoder that corresponds to the low complexity encoder of FIG. 6. The low complexity decoder receives the three streams 601, 602, 603 generated by the low complexity encoder together with headers 704 containing further decoding information. The encoded base stream 601 is decoded by a base decoder 710 corresponding to the base codec used in the low complexity encoder. The encoded level 1 stream 602 is received by a first decoder 711 (i.e. a level 1 decoder), which decodes a first set of residuals as encoded by the first encoder 615 of FIG. 1. At a first summation component 712, the output of the base decoder 710 is combined with the decoded residuals obtained from the first decoder 711. The combined video, which may be said to be a level 1 reconstructed video signal, is upsampled by upsampling component 713. The encoded level 2 stream 103 is received by a second decoder 714 (i.e. a level 2 decoder). The second decoder 714 decodes a second set of residuals as encoded by the second encoder 621 of FIG. 1. Although the headers 704 are shown in FIG. 7 as being used by the second decoder 714, they may also be used by the first decoder 711 as well as the base decoder 710. The output of the second decoder 714 is a second set of decoded residuals. These may be at a higher resolution to the first set of residuals and the input to the upsampling component 713. At a second summation component 715, the second set of residuals from the second decoder 714 are combined with the output of the up-sampling component 713, i.e. an up-sampled reconstructed level 1 signal, to reconstruct decoded video 750.

As per the low complexity encoder, the low complexity decoder of FIG. 7 may operate in parallel on different blocks or coding units of a given frame of the video signal. Additionally, decoding by two or more of the base decoder 710, the first decoder 711 and the second decoder 714 may be performed in parallel. This is possible as there are no inter-block dependencies.

In the decoding process, the decoder may parse the headers 704 (which may contain global configuration information, picture or frame configuration information, and data block configuration information) and configure the low complexity decoder based on those headers. In order to re-create the input video, the low complexity decoder may decode each of the base stream, the first enhancement stream and the further or second enhancement stream. The frames of the stream may be synchronised and then combined to derive the decoded video 750. The decoded video 750 may be a lossy or lossless reconstruction of the original input video 100 depending on the configuration of the low complexity encoder and decoder. In many cases, the decoded video 750 may be a lossy reconstruction of the original input video 600 where the losses have a reduced or minimal effect on the perception of the decoded video 750.

In each of FIG. 6 and FIG. 7, the level 2 and level 1 encoding operations may include the steps of transformation, quantization and entropy encoding (e.g., in that order). These steps may be implemented in a similar manner to the operations shown in FIG. 4 and FIG. 5. The encoding operations may also include residual ranking, weighting and filtering. Similarly, at the decoding stage, the residuals may be passed through an entropy decoder, a de-quantizer and an inverse transform module (e.g., in that order). Any suitable encoding and corresponding decoding operation may be used. Preferably however, the level 2 and level 1 encoding steps may be performed in software (e.g., as executed by one or more central or graphical processing units in an encoding device).

The transform as described herein may use a directional decomposition transform such as a Hadamard-based transform. Both may comprise a small kernel or matrix that is applied to flattened coding units of residuals (i.e. 2×2 or 4×4 blocks of residuals). More details on the transform can be found for example in patent applications PCT/EP2013/059847—published as WO2013/171173 or PCT/GB2017/052632—published as WO2018/046941, which are incorporated herein by reference. The encoder may select between different transforms to be used, for example between a size of kernel to be applied.

The transform may transform the residual information to four surfaces. For example, the transform may produce the following components or transformed coefficients: average, vertical, horizontal and diagonal. A particular surface may comprise all the values for a particular component, e.g. a first surface may comprise all the average values, a second all the vertical values and so on. As alluded to earlier in this disclosure, these components that are output by the transform may be taken in such embodiments as the coefficients to be quantized in accordance with the described methods. A quantization scheme may be useful to create the residual signals into quanta, so that certain variables can assume only certain discrete magnitudes. Entropy encoding in this example may comprise run length encoding (RLE), then processing the encoded output is processed using a Huffman encoder. In certain cases, only one of these schemes may be used when entropy encoding is desirable.

In summary, the methods and apparatuses herein are based on an overall approach which is built over an existing encoding and/or decoding algorithm (such as MPEG standards such as AVC/H.264, HEVC/H.265, etc. as well as non-standard algorithm such as VP9, AV1, and others) which works as a baseline for an enhancement layer which works accordingly to a different encoding and/or decoding approach. The idea behind the overall approach of the examples is to hierarchically encode/decode the video frame as opposed to the use block-based approaches as used in the MPEG family of algorithms. Hierarchically encoding a frame includes generating residuals for the full frame, and then a decimated frame and so on.

As indicated above, the processes may be applied in parallel to coding units or blocks of a colour component of a frame as there are no inter-block dependencies. The encoding of each colour component within a set of colour components may also be performed in parallel (e.g., such that the operations are duplicated according to (number of frames)*(number of colour components)*(number of coding units per frame)). It should also be noted that different colour components may have a different number of coding units per frame, e.g. a luma (e.g., Y) component may be processed at a higher resolution than a set of chroma (e.g., U or V) components as human vision may detect lightness changes more than colour changes.

Thus, as illustrated and described above, the output of the decoding process is an (optional) base reconstruction, and an original signal reconstruction at a higher level. This example is particularly well-suited to creating encoded and decoded video at different frame resolutions. For example, the input signal 30 may be an HD video signal comprising frames at 1920×1080 resolution. In certain cases, the base reconstruction and the level 2 reconstruction may both be used by a display device. For example, in cases of network traffic, the level 2 stream may be disrupted more than the level 1 and base streams (as it may contain up to 4× the amount of data where down-sampling reduces the dimensionality in each direction by 2). In this case, when traffic occurs the display device may revert to displaying the base reconstruction while the level 2 stream is disrupted (e.g., while a level 2 reconstruction is unavailable), and then return to displaying the level 2 reconstruction when network conditions improve. A similar approach may be applied when a decoding device suffers from resource constraints, e.g. a set-top box performing a systems update may have an operation base decoder 220 to output the base reconstruction but may not have processing capacity to compute the level 2 reconstruction.

The encoding arrangement also enables video distributors to distribute video to a set of heterogeneous devices; those with just a base decoder 720 view the base reconstruction, whereas those with the enhancement level may view a higher-quality level 2 reconstruction. In comparative cases, two full video streams at separate resolutions were required to service both sets of devices. As the level 2 and level 1 enhancement streams encode residual data, the level 2 and level 1 enhancement streams may be more efficiently encoded, e.g. distributions of residual data typically have much of their mass around 0 (i.e. where there is no difference) and typically take on a small range of values about 0. This may be particularly the case following quantization. In contrast, full video streams at different resolutions will have different distributions with a non-zero mean or median that require a higher bit rate for transmission to the decoder. In the examples described herein residuals are encoded by an encoding pipeline. This may include transformation, quantization and entropy encoding operations. It may also include residual ranking, weighting and filtering. Residuals are then transmitted to a decoder, e.g. as L-1 and L-2 enhancement streams, which may be combined with a base stream as a hybrid stream (or transmitted separately). In one case, a bit rate is set for a hybrid data stream that comprises the base stream and both enhancements streams, and then different adaptive bit rates are applied to the individual streams based on the data being processed to meet the set bit rate (e.g., high-quality video that is perceived with low levels of artefacts may be constructed by adaptively assigning a bit rate to different individual streams, even at a frame by frame level, such that constrained data may be used by the most perceptually influential individual streams, which may change as the image data changes).

The sets of residuals as described herein may be seen as sparse data, e.g. in many cases there is no difference for a given pixel or area and the resultant residual value is zero. When looking at the distribution of residuals much of the probability mass is allocated to small residual values located near zero—e.g. for certain videos values of −2, −1, 0, 1, 2 etc. occur the most frequently. In certain cases, the distribution of residual values is symmetric or near symmetric about 0. In certain test video cases, the distribution of residual values was found to take a shape similar to logarithmic or exponential distributions (e.g., symmetrically or near symmetrically) about 0. The exact distribution of residual values may depend on the content of the input video stream.

Residuals may be treated as a two-dimensional image in themselves, e.g. a delta image of differences. Seen in this manner the sparsity of the data may be seen to relate features like "dots", small "lines", "edges", "corners", etc. that are visible in the residual images. It has been found that these features are typically not fully correlated (e.g., in space and/or in time). They have characteristics that differ from the characteristics of the image data they are derived from (e.g., pixel characteristics of the original video signal).

As the characteristics of residuals differ from the characteristics of the image data they are derived from it is generally not possible to apply standard encoding approaches, e.g. such as those found in traditional Moving Picture Experts Group (MPEG) encoding and decoding standards. For example, many comparative schemes use large transforms (e.g., transforms of large areas of pixels in a normal video frame). Due to the characteristics of residuals, e.g. as described above, it would be very inefficient to use these comparative large transforms on residual images. For example, it would be very hard to encode a small dot in a residual image using a large block designed for an area of a normal image.

Certain examples described herein address these issues by instead using small and simple transform kernels (e.g., 2×2 or 4×4 kernels—the Directional Decomposition and the Directional Decomposition Squared—as presented herein). The transform described herein may be applied using a Hadamard matrix (e.g., a 4×4 matrix for a flattened 2×2 coding block or a 16×16 matrix for a flattened 4×4 coding block). This moves in a different direction from comparative video encoding approaches. Applying these new approaches to blocks of residuals generates compression efficiency. For example, certain transforms generate uncorrelated transformed coefficients (e.g., in space) that may be efficiently compressed. While correlations between transformed coefficients may be exploited, e.g. for lines in residual images, these can lead to encoding complexity, which is difficult to implement on legacy and low-resource devices, and often generates other complex artefacts that need to be corrected. Pre-processing residuals by setting certain residual values to 0 (i.e. not forwarding these for processing) may provide a controllable and flexible way to manage bitrates and stream bandwidths, as well as resource use.

Examples Relating to Post Processing

Certain examples described herein facilitate post-processing of decoded video data. Certain examples are particularly useful for multi-layer decoding approaches such as those based on LCEVC and VC-6 as described above. In examples, a selective or conditional sample conversion is performed before applying at least one post-processing operation. This at least one post-processing operation may include dithering. Sample conversion converts an original video property of an output decoded video stream to a desired video property. The desired video property may be signalled by a rendering device, such as a mobile client application, a smart television or another display device. Examples below are presented where the video property relates to a video resolution (e.g. a number of pixels in one or more dimensions); however, the examples may be extended to other video properties such as bit-depth (e.g. representing colour depth), frame rate, etc.

Figure 8:
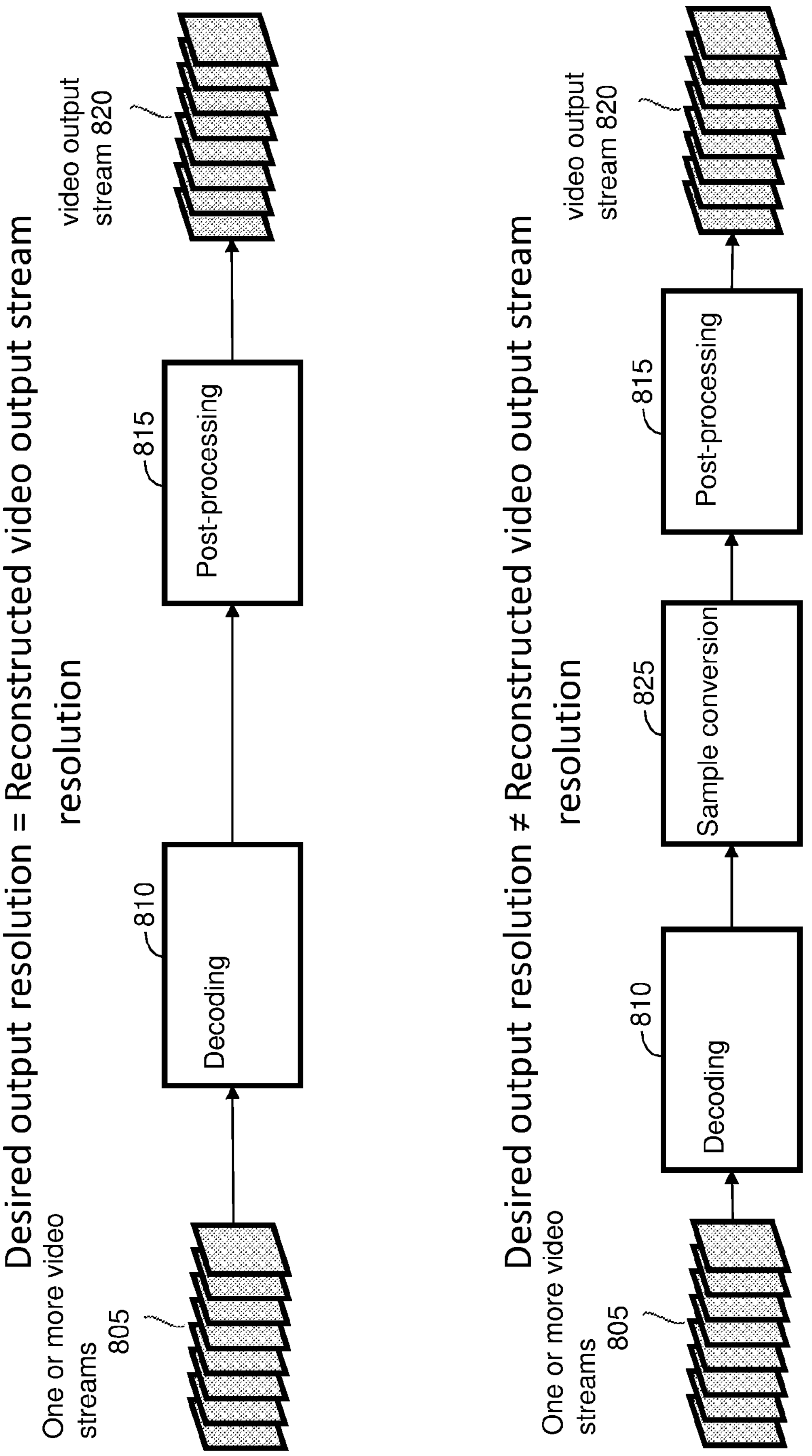
FIG. 8 shows in a block diagram a technique for post-processing and sample converting a video stream prior to rendering said video stream.

FIG. 8 is a block diagram showing a technique for post-processing a decoded video stream prior to rendering said video stream according to one exemplary embodiment. In a general form, a video stream at a first resolution 805 is decoded at block 810 to create a reconstructed video output stream. The reconstructed video output stream resolution is compared with a desired output resolution received from a rendering platform, e.g., received as part of an application programming interface API function call. If the desired output resolution equals the reconstructed video output stream resolution, the reconstructed video output stream undergoes post-processing at block 815 before it is outputted at block 820. However, if the desired output resolution does not equal the reconstructed video output stream resolution, the reconstructed video output stream undergoes the necessary sample conversion at block 825 in order to make the reconstructed video output stream resolution equal the desired output resolution before post-processing at block 815 to outputting at block 820.

Figure 9:
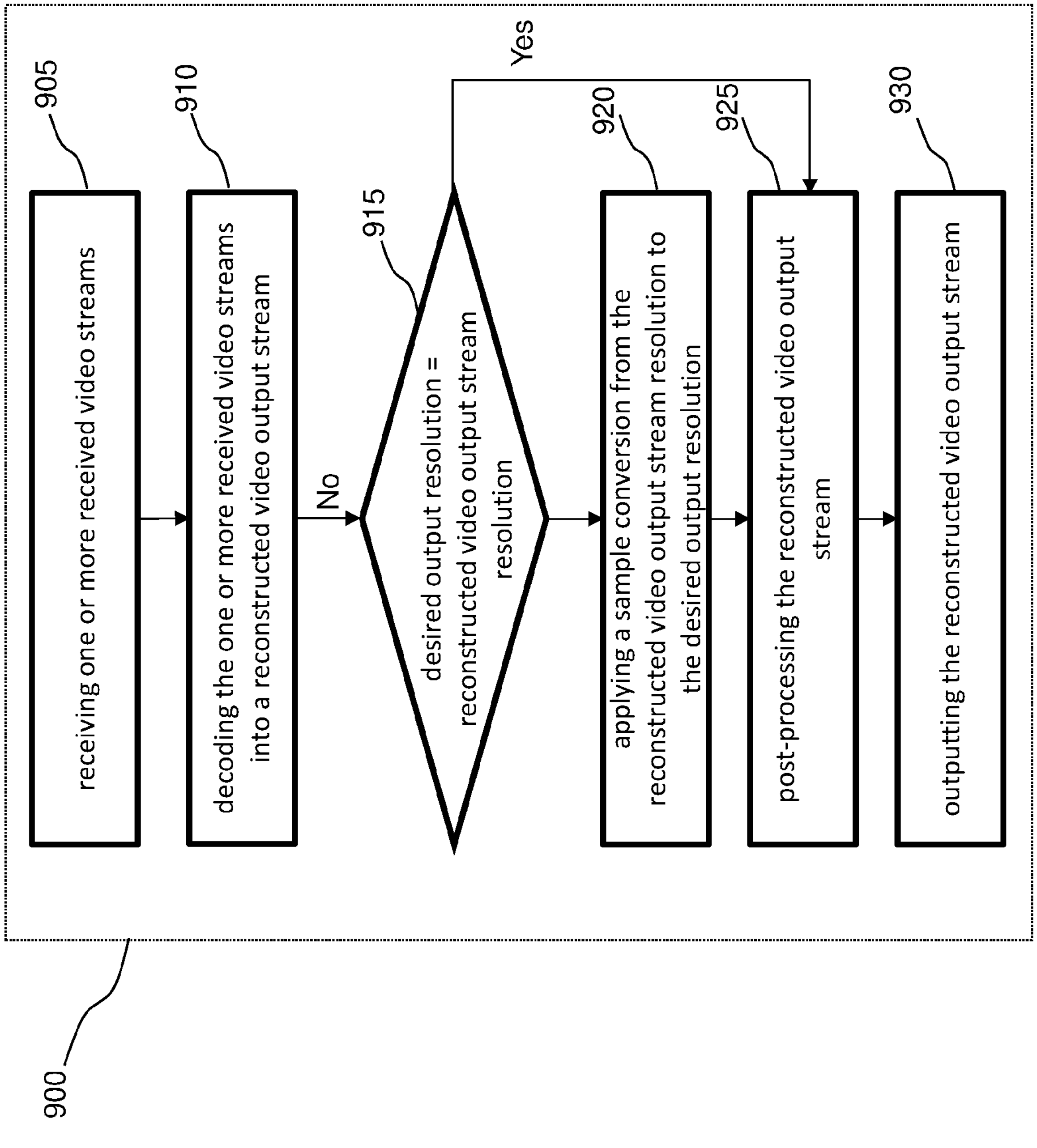
FIG. 9 shows in a flow chart a method for post-processing and sample converting a video stream prior to rendering said video stream.

FIG. 9 depicts in a flow chart a method 900 for post-processing a video stream in accordance with the disclosure of FIG. 8. At 905, the method comprises receiving one or more received video streams. At 910, the one or more received video streams are decoded to produce a reconstructed video output stream. At 915, the reconstructed video output stream resolution is compared with a desired output stream resolution received from a rendering platform. If the desired output resolution equals the reconstructed video output stream resolution, the method proceeds to step 925 where the reconstructed video output stream is post-processed and then the reconstructed video output stream is outputted at step 930. However, if the desired output resolution does not equal the reconstructed video output stream resolution at step 915, the method proceeds to step 920 before proceeding to step 925 in order to make the reconstructed video output stream resolution equal to the desired output resolution before post-processing at step 925 and then outputting the reconstructed video output stream at step 930.

Just before rendering a signal at a rendering platform, it may be preferred that the signal intended for rendition at a rendering platform to have a specific resolution. The optimum resolution for display is usually determined by the rendering platform. Therefore, an aspect of the invention uses an API function, for example to receive the desired output resolution from the rendering platform in order to determine what resolution a reconstructed signal must have to achieve the best visual result. After determining the optimum resolution to display the reconstructed signal, the reconstructed signal undergoes sampling conversion (i.e., upsampling or downsampling) at step 920 to achieve said optimum resolution.

Combining post-processing and sample conversion, if not done carefully, may lead to an undesired effect on the final rendition. For example, applying dithering to a low resolution signal and then upsampling the low resolution signal may cause the formation of undesired noise. Therefore, contrary to contemporary techniques, the technique used in FIG. 8 and FIG. 9 applies post-processing, such as dithering, after applying sample conversion to mitigate the negative effects of the sample conversion on the post-processed signal. For example, a controlled post-processing step can quickly become corrupted and no longer controlled if followed by sample conversion.

In addition, in comparative contemporary techniques, an output video property, such as resolution, is deemed to be set as part of the video encoding; decoders are configured to receive a data stream representing a signal at a particular resolution and to decode that signal to output data at that particular resolution. Hence, decoding specifications instruct the performance of post-processing as a fixed or "hard-wired" stage after a set of decoding stages. The decoder is thus treated as a "black-box" with a defined output to be rendered, where the post-processing is performed within the "black-box". However, this approach leads to problems where a decoded output needs to be flexibly rendered, e.g. based on user preference or due to the use of rendering approaches such as "picture-in-picture" or "multi-screen".

In certain approaches, scalable encoded signal streams have been used to provide a multitude of selectable output resolutions, in certain cases have a set of multi-cast streams at different resolutions or using scalable codecs such as scalable video codec (SVC) or Scalable HEVC (SHVC). However, these cases do not allow for selectable and flexible changes in the decoder output, e.g. the available resolutions are set by the configuration of the different layer streams. As such there is no sample conversion, instead a particular decoded level is selected. In this comparative cases, post-processing is performed at a decoded resolution rather than a desired display resolution.

Occasionally, display devices such as mobile devices and televisions may include their own upscaling or colour-depth enhancements, but these are applied to the output of the decoder "black box" where post-processing, e.g. according to a standardised decoding specification, has already been performed. Hence, in these comparative cases, there is a high likelihood that sample conversion applied to the decoder output will produce visual artifacts.

In this exemplary embodiment, the post-processing is applied dynamically and content-adaptively depending on the quality of the base layer, e.g., quality of light as well as other factors. This advantageous because allows for a tailored post-processing application in order to achieve a best visual result. For example, post-processing parameters may be determined based on one or more image metrics computed at the encoder (and signalled across) and/or at the decoder during decoding. These parameters may comprise dithering strength, sharpening, and other noise addition.

In one exemplary embodiment, the sample conversion comprises upsampling the reconstructed video output stream resolution to the desired output resolution. The upsampling may comprise one of non-linear upsampling, neural network upsampling or fractional upsampling. In the latter case, the desired resolution may comprise any multiple or fraction of the decoder output resolution. However, it can be understood the skilled person the downsampling a reconstructed video output stream is also possible when the desired output resolution is lower that the reconstructed video output stream resolution.

The upsampling may comprise one of non-linear upsampling, neural network upsampling or fractional upsampling. This is advantageous because it allows for customised resolution ratios and achieves a precise upsampling.

In this exemplary embodiment, the post-processing is dithering in order to minimise visual impairments, such as colour banding or blocking artefacts. However, it can be understood to the skilled person that similar technique may be applied to other types of post-processing methods in order to enhance the final rendered signal.

The post-processing dithering employs a dithering type and a dithering strength. The dithering type specifies whether to apply a uniform dithering algorithm or not. The dithering type can be set to no dithering is applied or uniform random dithering is applied. The dithering strength specifies the maximum dithering strength to be used. The dithering strength is set based on at least one of a determination of contrast or a determination of frame content.

In this exemplary embodiment, a parameter is used to indicate a base quantisation parameter (QP) value to start applying the dither. In additional parameter is used to indicate the base QP value at which to saturate the dither. An input signal is also used to enable or disable the dithering. The input signal may be a binary input signal but it can be understood that other input signal to indicate enabling or disabling of the dithering may be used. The enabling and disabling signals may originate from the rendering platform via an API function call. Adaptive dithering is explained in more detail within the LCEVC specification; however, here the adaptive dithering is performed following an additional sample conversion, which is not taught within the LCEVC specification.

Figure 10:
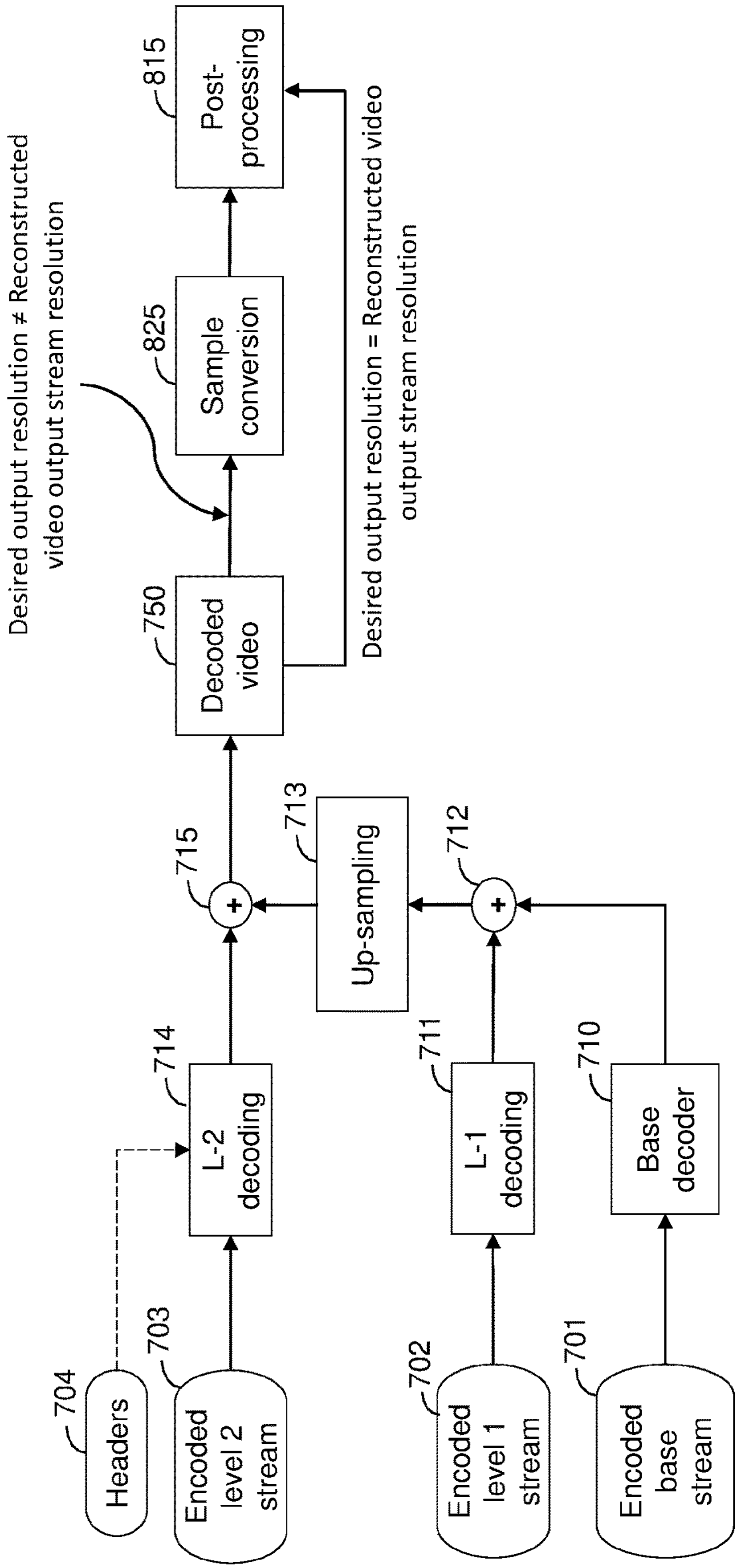
FIG. 10 shows in a high-level schematic the post-processing and sample conversion demonstrated in FIG. 8 and FIG. 9 and implemented in the decoding process of FIG. 7.

FIG. 10 shows in a high-level schematic the post-processing and sample conversion discussed with reference to FIG. 8 and FIG. 9. This example shows the general teaching of FIG. 8 and FIG. 9 implemented in the specific LCEVC decoding embodiment of FIG. 7. Of course, the general teaching is also applicable to the embodiments shown and described with reference to VC-6 and other similar decoding techniques. In this exemplary embodiment, the details of FIG. 7 are not repeated and like reference numerals describe like components and arrangements. As can be seen in FIG. 10, following the creation of decoded video/reconstructed video output stream 750, blocks 825 and 815 from FIG. 8 are employed in order to enhance the visual appearance of the final rendition.

Figure 11:
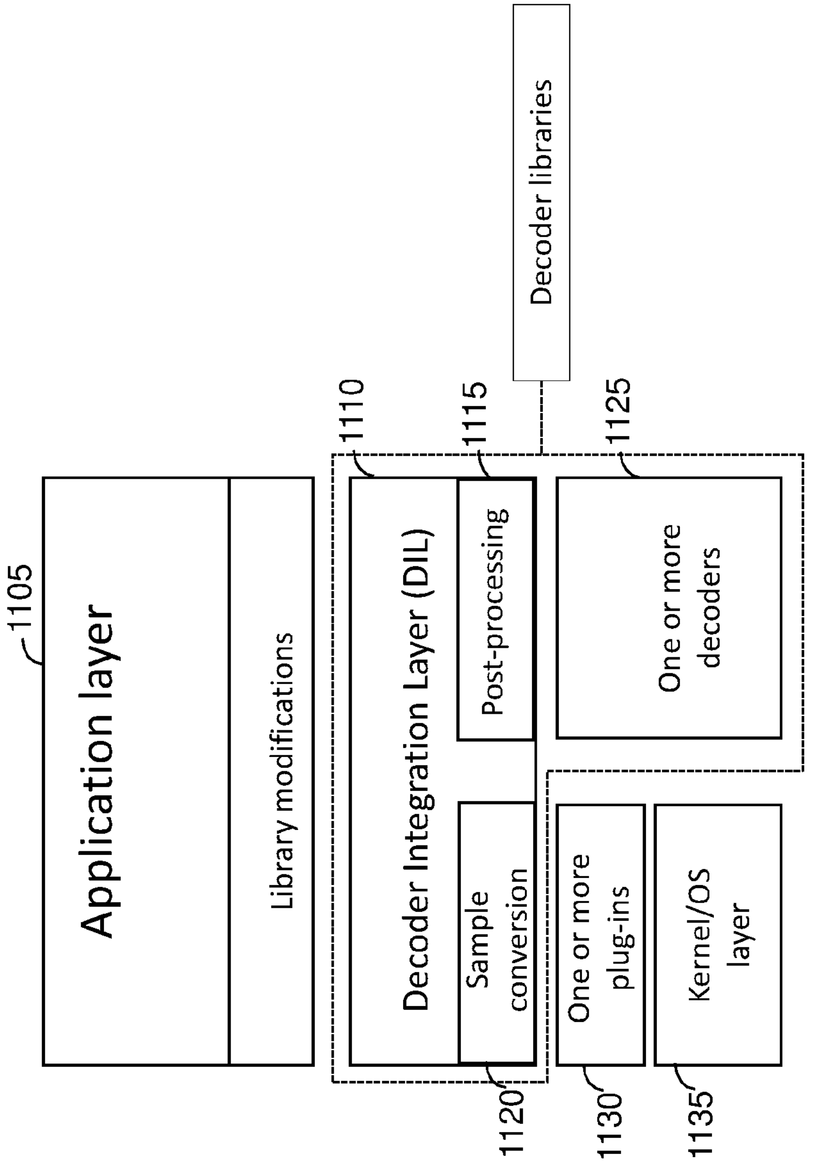
FIG. 11 shows a decoder implementation to perform the methods outlined in FIG. 8 and FIG. 9.

FIG. 11 illustrate a decoder implementation to perform the methods outlined in FIG. 8 and FIG. 9. FIG. 11 comprises application layer 1105 in which a reconstructed video stream may be rendered by a client application after the sample conversion and post processing described herein with reference to FIG. 8, FIG. 9 and FIG. 10. For example, the client application may comprise a smart television media player application, a mobile device application, a desktop application or the like. FIG. 11 also comprises a decoder integration layer (DTL) 1110 which operates with one or more decoders 1120, one or more plug-ins 1130 and Kernel/Operating System (OS) layer 1135 to decode video streams into a reconstructed video output stream. In FIG. 11, at least the decoder integration layer 1110 and the one or more decoders 1125 may form a set of decoder libraries. The one or more decoders 1125 may comprise enhancement decoders such as LCEVC decoders.

In this exemplary embodiment, the decoder integration layer 1110 controls operation of the one or more decoder plug-ins 1130 and the one or more decoders 1125 to generate the reconstructed video output stream. The decoding may be achieved using one or more decoders comprising one or more of AV1, VVC, AVC and LCEVC. The one or more decoder plug-ins 1130 may form part of the set of decoder libraries and/or may be provided by third parties. In the case the one or more decoders 1125 comprise enhancement decoders, the one or more decoder plug-ins present a common interface to the decoder integration layer 1110 while wrapping the varying methods and commands used to control different sets of underlying base decoders. For example, a base decoder may be implemented using native (e.g. operating system) functions from the Kernel/OS layer 1135. The base decoder may, for example, be a low-level media codec accessed using an operating system mechanism such as MediaCodec commands (e.g. as found in the Android operating system), VTDecompression Session commands (e.g. as found in the iOS operating system) or Media Foundation Transforms commands (MFT—e.g. as found in the Windows family of operating systems), depending on the operating system.

The decoder integration layer may contain post-processing module 1115 and/or sample conversion module 1120 to apply the post-processing and the sample conversion to the reconstructed video output stream as outlined with reference to FIG. 8, FIG. 9 and FIG. 10. Alternatively, the post-processing and/or the sample conversion may form part of any of the decoder integration layer 1110, the one or more plug-ins 1130, the one or more decoders 1125 or a separate a separate unit within the set of decoder libraries. When the one or more decoders comprise one or more LCEVC decoders, the decoder library may be a set of corresponding LCEVC decoder libraries.

Additionally, a control interface forms part of the decoder integration layer 1110. The control interface may be considered as the interface between the application layer 1105 and the decoder integration layer 1110. The control interface may comprise a set of externally callable methods or functions, e.g. that are callable from a client application operating within the application layer 1105. The decoder integration layer 1110 may thus be considered an extension of the kernel/OS layer 1135 to provide decoding functions to applications (or a set of decoding middleware). The application layer 1105 may provide a rendering platform on a client computing or display device, where the control interface is provided as an API accessible to applications running within the application layer 1105. The desired output stream properties discussed herein may be communicated between an application running in the application layer 1105 to the decoder integration layer 1110 via the control interface. For example, one or more desired video output properties such as resolutions or bit-depths may be set via function calls to the control interface that pass setting values and/or as part of executing a decoding-related external method provided by the decoder integration layer.

Certain examples describe herein avoid image quality issues where a display device upsamples or upscales a decoder output that includes post-processing. For example, display device upsampling of a decoder output with dithering may lead to unsightly dithering "blobs", where dithering noise is upsampled. In examples, such as LCEVC examples, where a display resolution is higher than an output resolution (such as a decoded reconstruction output from enhancement layer 2), custom scaling may be performed based a command received by a decoder integration layer from the display device, and then dithering is applied on the custom upscaled output. In certain cases, custom upscaling prior to decoder output may also enable more advanced upscaling methods to be used (e.g. as opposed to fixed older upscaling methods that may be found "built-in" to display devices). Furthermore, upscaling may also use content-adaptive parameters (e.g. different parameters for different coding blocks based on encoding and/or decoding metrics) that are available to the decoder but that are not available to the display device. In these cases, the decoder can receive media player information about the display resolution, since the decoder video stream only contains information on the decoding resolution, and this media player information may be provided regardless of the display capabilities.

Example Apparatus for Implementing the Encoder

Figure 12:
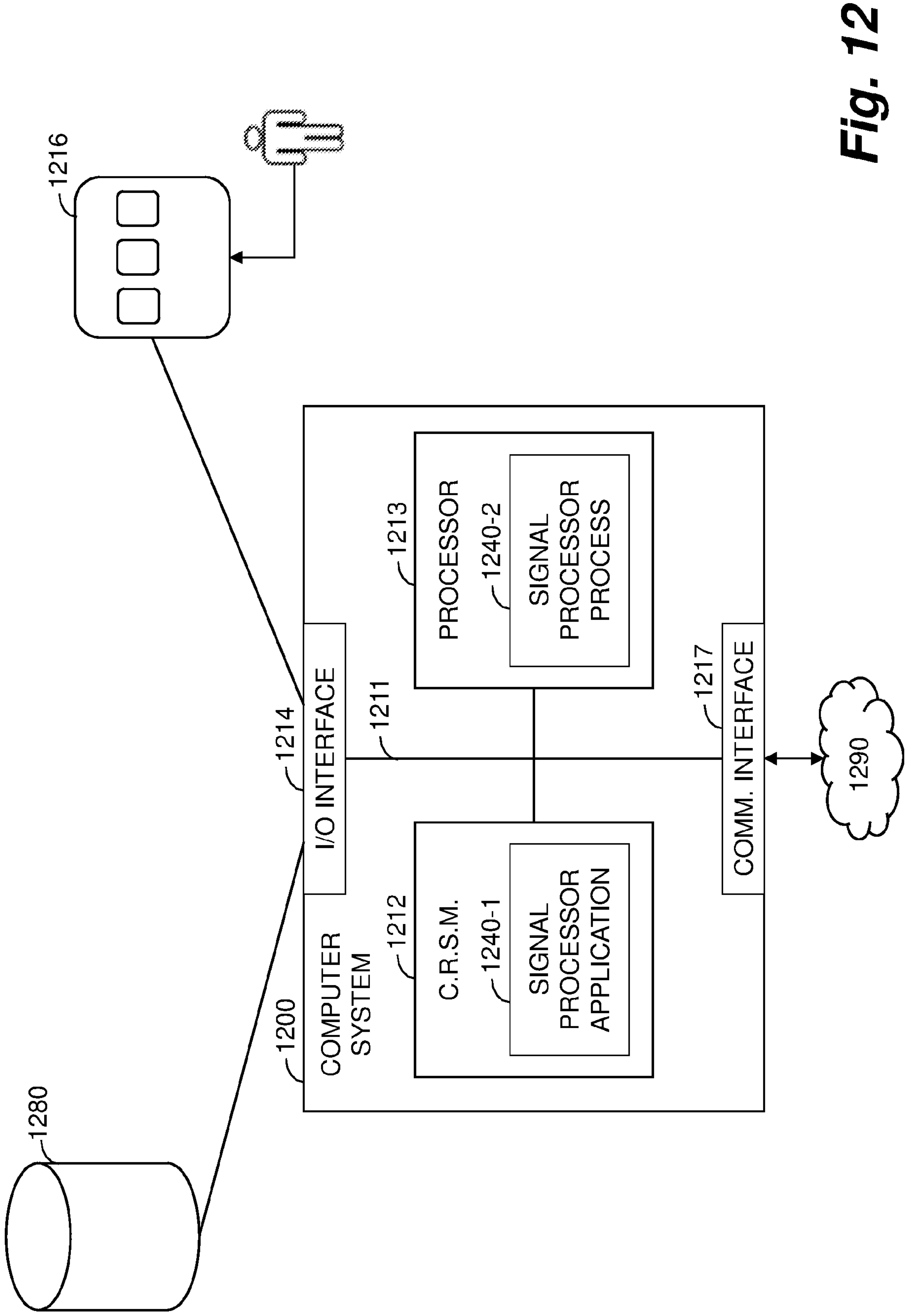
FIG. 12 shows a block diagram of an example of an apparatus in accordance with embodiments.

Referring to FIG. 12, there is shown a schematic block diagram of an example of an apparatus 1200.

Examples of the apparatus 1200 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, a peripheral device such as a switch, modem, router, a vehicle etc., or in general any type of computing or electronic device.

In this example, the apparatus 1200 comprises one or more processors 1213 configured to process information and/or instructions. The one or more processors 1213 may comprise a central processing unit (CPU). The one or more processors 1213 are coupled with a bus 1211. Operations performed by the one or more processors 1213 may be carried out by hardware and/or software. The one or more processors 1213 may comprise multiple co-located processors or multiple disparately located processors.

In this example, the apparatus 1213 comprises computer-useable memory 1212 configured to store information and/or instructions for the one or more processors 1213. The computer-useable memory 1212 is coupled with the bus 1211. The computer-usable memory may comprise one or more of volatile memory and non-volatile memory. The volatile memory may comprise random access memory (RAM). The non-volatile memory may comprise read-only memory (ROM).

In this example, the apparatus 1200 comprises one or more external data-storage units 1280 configured to store information and/or instructions. The one or more external data storage units 1280 are coupled with the apparatus 1200 via an I/O interface 1214. The one or more external data-storage units 1280 may for example comprise a magnetic or optical disk and disk drive or a solid-state drive (SSD).

In this example, the apparatus 1200 further comprises one or more input/output (I/O) devices 1216 coupled via the I/O interface 1214. The apparatus 1200 also comprises at least one network interface 1217. Both the I/O interface 1214 and the network interface 1217 are coupled to the systems bus 1211. The at least one network interface 1217 may enable the apparatus 1200 to communicate via one or more data communications networks 1290. Examples of data communications networks include, but are not limited to, the Internet and a Local Area Network (LAN). The one or more I/O devices 1216 may enable a user to provide input to the apparatus 1200 via one or more input devices (not shown). The one or more I/O devices 1216 may enable information to be provided to a user via one or more output devices (not shown).

In FIG. 12, a (signal) processor application 1240-1 is shown loaded into the memory 1212. This may be executed as a (signal) processor process 1240-2 to implement the methods described herein (e.g. to implement suitable encoders or decoders). The apparatus 1200 may also comprise additional features that are not shown for clarity, including an operating system and additional data processing modules. The (signal) processor process 1240-2 may be implemented by way of computer program code stored in memory locations within the computer-usable non-volatile memory, computer-readable storage media within the one or more data-storage units and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 1200 may therefore comprise a data processing module which can be executed by the one or more processors 1213. The data processing module can be configured to include instructions to implement at least some of the operations described herein. During operation, the one or more processors 1213 launch, run, execute, interpret or otherwise perform the instructions.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program. It will be appreciated that the apparatus 1200 may comprise more, fewer and/or different components from those depicted in FIG. 12. The apparatus 1200 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

The above embodiments are to be understood as illustrative examples. Further embodiments are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for video decoding, the method comprising:

receiving, via a control interface from a rendering platform, an indication of at least one desired video output property from a rendering platform;

decoding one or more received video streams into a reconstructed video output stream;

comparing the received desired video output property with a property of the reconstructed video output stream;

when the desired video output property differs from the property of the reconstructed video output stream, applying a sample conversion to the reconstructed video output stream to provide the desired video output property; and applying post-processing to the reconstructed video output stream after the sample conversion, wherein post-processing is applied prior to output of the reconstructed video stream.

2. The method of claim 1, wherein the post-processing is applied dynamically and content-adaptively.

3. The method of claim 1, wherein the desired video output property is a desired video output resolution, and the sample conversion comprises converting from a resolution of the reconstructed video output stream to the desired video output resolution when the desired video output resolution differs from the resolution of the reconstructed video output stream.

4. The method of claim 3, wherein the upsampling comprises one of non-linear upsampling, neural network upsampling or fractional upsampling.

5. The method of claim 1, wherein the desired video output property is a desired bit-depth, and the sample conversion comprises converting from a bit-depth of the reconstructed video output stream to the desired video output bit-depth when the desired video output bit-depth differs from the bit-depth of the reconstructed video output stream.

6. The method of claim 1, wherein the sample conversion comprises upsampling the reconstructed video output stream resolution to a desired output resolution.

7. The method of claim 1, wherein the post-processing comprises dithering.

8. The method of claim 7, further comprising receiving one or more of a dithering type and a dithering strength and/or wherein at least one of the following applies:

a) wherein the dithering strength is set based on at least one of a determination of contrast or a determination of frame content;

b) receiving a parameter that indicates a base quantisation parameter—QP—value to start applying the dither;

c) receiving a parameter that indicates a base quantisation parameter—QP—value at which to saturate the dither; and d) receiving an input to enable or disable the dithering.

9. A system for video decoding comprising:

one or more processors; and one or more non-tangible computer hardware storage devices having stored thereon executable instructions that when executed by the one or more processors, cause the system to perform the following:

receive, via a control interface from a rendering platform, an indication of at least one desired video output property from a rendering platform;

decode one or more received video streams into a reconstructed video output stream;

compare the received desired video output property with a property of the reconstructed video output stream;

when the desired video output property differs from the property of the reconstructed video output stream, apply a sample conversion to the reconstructed video output stream to provide the desired video output property; and apply post-processing to the reconstructed video output stream after the sample conversion, wherein post-processing is applied prior to output of the reconstructed video stream.

10. The system of claim 9, wherein the decoding is achieved using one or more decoders comprising one or more of AV1, VVC, AVC and LCEVC.

11. The system of claim 10, wherein the one or more decoders are implemented using native or operating system functions.

12. The system of claim 9, comprising a decoder integration layer and one or more decoder plug-ins, wherein a control interface forms part of the decoder integration layer; and the one or more decoder plug-ins provide an interface to the one or more decoders.

13. The system of claim 9, wherein the post processing is achieved using a post-processing module and the sample conversion is achieved using a sample conversion module, wherein at least one of the post-processing module or the sample conversion module form part of one or more of the decoder integration layer and the one or more decoder plug-ins.

14. The system of claim 13, wherein the one or more decoders comprise a decoder to implement a base decode layer to decode a video stream and an enhancement decoder to implement an enhancement decode layer.

15. The system of claim 14, wherein the enhancement decoder is configured to:

receive an encoded enhancement stream, and decode the encoded enhancement stream to obtain one or more layers of residual data, the one or more layers of residual data being generated based on a comparison of data derived from a decoded video stream and data derived from an original input video stream.

16. The system of claim 15, wherein the decoder integration layer controls operation of the one or more decoder plug-ins and the enhancement decoder to generate the reconstructed video output stream using a decoded video stream from the base decode layer and the one or more layers of residual data from the enhancement decode layer.

17. The system claim 12, wherein the rendering platform is a client application on a client computing device and the control interface is an application programming interface-API-accessible to the client application.

18. The system of claim 17, wherein the post-processing is enabled or disabled via the control interface by the rendering platform.

19. The system claim 17, wherein the desired video output property is communicated from the rendering platform via the control interface.

20. A non-transitory computer-readable medium comprising instructions which when executed cause a processor to perform the following:

receive, via a control interface from a rendering platform, an indication of at least one desired video output property from a rendering platform;

decode one or more received video streams into a reconstructed video output stream;

compare the received desired video output property with a property of the reconstructed video output stream;

when the desired video output property differs from the property of the reconstructed video output stream, apply a sample conversion to the reconstructed video output stream to provide the desired video output property; and apply post-processing to the reconstructed video output stream after the sample conversion, wherein post-processing is applied prior to output of the reconstructed video stream.

* * * * *